US012065523B2

(12) United States Patent
Froese et al.

(10) Patent No.: US 12,065,523 B2
(45) Date of Patent: Aug. 20, 2024

(54) TRI-FUNCTIONAL LONG-CHAIN BRANCHED POLYOLEFIN

(71) Applicant: Dow Global Technologies LLC, Midland, MI (US)

(72) Inventors: Robert D. J. Froese, Midland, MI (US); Teresita Kashyap, Lake Jackson, TX (US); Oscar D. Redwine, Coleman, MI (US); Daniel J. Arriola, Midland, MI (US); Robert L. Sammler, Midland, MI (US); Cornelis F. J. Den Doelder, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 63 days.

(21) Appl. No.: 17/599,723

(22) PCT Filed: Mar. 27, 2020

(86) PCT No.: PCT/US2020/025387
§ 371 (c)(1),
(2) Date: Sep. 29, 2021

(87) PCT Pub. No.: WO2020/205585
PCT Pub. Date: Oct. 8, 2020

(65) Prior Publication Data
US 2022/0227905 A1    Jul. 21, 2022

Related U.S. Application Data

(60) Provisional application No. 62/826,274, filed on Mar. 29, 2019.

(51) Int. Cl.
*C08F 210/18*    (2006.01)
(52) U.S. Cl.
CPC .................... *C08F 210/18* (2013.01)
(58) Field of Classification Search
CPC ........................................... C08F 210/18
USPC ............................................. 526/279
See application file for complete search history.

(56) References Cited

U.S. PATENT DOCUMENTS

| | | | |
|---|---|---|---|
| 5,965,756 A | 10/1999 | McAdon et al. | |
| 6,300,451 B1 * | 10/2001 | Mehta | C08F 210/18 526/170 |
| 6,417,281 B1 * | 7/2002 | Garcia-Franco | C08L 23/0815 525/320 |
| 7,553,917 B2 | 6/2009 | Beigzadeh et al. | |
| 8,784,786 B2 * | 7/2014 | Hough | A61K 8/91 526/273 |
| 2004/0241130 A1 | 12/2004 | Tamareselvy et al. | |
| 2007/0265159 A1 | 11/2007 | Elam et al. | |
| 2011/0243873 A1 * | 10/2011 | Hough | C08F 220/68 526/273 |
| 2013/0209774 A1 | 8/2013 | Shirodkar et al. | |
| 2021/0388131 A1 * | 12/2021 | Froese | C08F 210/02 |
| 2022/0033547 A1 * | 2/2022 | Kashyap | C08F 210/02 |

FOREIGN PATENT DOCUMENTS

| | | | |
|---|---|---|---|
| CN | 1161700 A | 10/1997 | |
| JP | H08 59723 A | 3/1996 | |
| JP | 2013124262 A | 6/2013 | |
| WO | 90400500 A1 | 1/1994 | |
| WO | WO-9400500 A1 * | 1/1994 | .............. C08F 10/00 |
| WO | 1996/012744 A1 | 5/1996 | |
| WO | WO-9612744 A1 * | 5/1996 | ............ C08F 210/18 |
| WO | 2020/069362 A1 | 4/2020 | |
| WO | 2020/069364 A1 | 4/2020 | |
| WO | 2020/069365 A1 | 4/2020 | |
| WO | 2020/069370 A1 | 4/2020 | |

OTHER PUBLICATIONS

Thailand Office Action dated May 8, 2022, pertaining to Thailand Patent Application No. 2101006043 6 pages.
Balke, A Strategy for Interpreting Multidetector Size-Exclusion Chromotography Data I, Development of Systematic Approach, Chromatography of Polymers, Chapter 12, 1992, pp. 1980-198.
Balke, A Strategy for Interpreting Multidetector Size-Exclusion Chromotography Data II, Chromatography of Polymers, Chapter 13, 1992, pp. 199-219.
Cozewith, Polymer Crosslinking in Continuous Flow Stirred Reactors, Chemical Engineering Science, 1979, pp. 245-248, vol. 14.
Guzman, Simple Model of Predict Gel Formation in Olefin-Diene Copolymerizations Catalyzed by Constrained-Geometry Complexes, American Institute of Chemical Engineers, 2010, pp. 1325-1333, vol. 56.
Hou, Speedy, Robust and Quantitative Analysis of Polyolefins Using Sensitivity-Enhanced 13C Nmr Spectroscopy, Macromolecules, 2017, pp. 2407-2414, vol. 50.
Tobita, Kinetics of free-radical copolymerization: the pseudo-kinetic rate constant method, Polymer, 1991, pp. 2641-2647, vol. 14.
Tobita, Molecular Weight Distribution in Randon Crosslinking of Polymer Chains, Journal of Polymer Science, Part B. Polymer Physics, 1995, pp. 1191-1202, vol. 33.

(Continued)

*Primary Examiner* — Michael M. Bernshteyn
(74) *Attorney, Agent, or Firm* — Dinsmore & Shohl LLP

(57) ABSTRACT

Embodiments of this disclosure include polymers comprising the polymerized product of ethylene, at least one diene comonomer, and optionally at least one $C_3$ to $C_{14}$ comonomer. The polymer comprises tri-functional long-chain branches resulting from the diene that occur at a frequency of at least 0.03 per 1000 carbon atoms of the polymer. The diene has a structure according to formula (I):

15 Claims, 12 Drawing Sheets

(56) References Cited

OTHER PUBLICATIONS

Ver Strate, Branching of Copolymerization of Monovinyl and Divinyl Monomers in Continuous-Flow Stirred Reactors, Journal of Applied Polymer Science, 1980, pp. 59-62, vol. 25.

Williams The Construction of a Polyethylene Calibration Curve for Gel Permeation, on Chromatography Using Polystyrene Fractions, Polymer Letters, 1968, pp. 621-624, vol. 6.

Yau, Examples of Using 3D-GPC-TREF for Polyolefin Characterizations, Macromol Symp. Journal, 2007, pp. 29-45, vol. 257, Wiley.

Zimm, Apparatus and Methods of Measurement and Interpretation of the Angular Variation of Light Scattering; Preliminary Results on Polystyrene Solutions, The Journal of Chemical Physics, 1948, pp. 1099-1116, vol. 16, No. 12.

International Preliminary Report on Patentability, pertaining to Application No. PCT/US2020025387, dated Jul. 14, 2021, 8 pages.

International Search Report and Written Opinion Patent Application No. PCT/US2020/025400 dated Jun. 23, 2020 (18 pages).

International Search Report and Written Opinion issued by the Patent Application No. PCT/US2020/025397 dated Jun. 23, 2020 (4 pages).

International Preliminary Report on Patentability, pertaining to Application No. PCT/US2020/025400, dated Jul. 16, 2021 18 pages.

International Preliminary Report on Patentability, pertaining to PCT/US2020/025397, dated Nov. 22, 2021.

Communication Rule 161/162 For Application No. 20721035.2 Issued Dec. 16, 2021.

Communication Rule 161/162 For Application No. 20720290.4 Issued Nov. 8, 2021.

Communication Rule 161/162 For Application No. 20719897.9, Issued Nov. 8, 2021.

Salata, Michael R., et al., "Catalyst Nuclearity Effects in Olefin Polymerization, Enhanced Activity and Comonomer Enchainment in Ethylene + Olefin Copolymerizations Mediated by Bimetallic Group 4 Phenoxyiminato Catalysts", Macromolecules, vol. 42, No. 6, pp. 1920-1933 (Mar. 2, 2009).

Napoli, Mariagrazia et al., "Cyclocopolymerization of 1,4-pentadiene with ethene in the presence of group-4 metallocenes", Journal of Polymer Science, Part A: Polymer Chemistry, vol. 44, No. 19, pp. 5525-5532 (Aug. 22, 2006).

International Search Report and Written Opinion issued by the European Patent Office as International Searching Authority for International Patent Application No. PCT/US2020/025387 dated Jun. 23, 2020 (16 pages).

Chinese Office Action dated Jan. 9, 2023, pertaining to CN Patent Application No. 202080023959.0, 9 pgs.

Singapore Office Action dated Jan. 16, 2023, relating to patent application 11202109338W, 7 pgs.

Singapore Written Opinion, dated Jan. 16, 2023, pertaining to Singapore Patent Application No. 11202109432Q 8 pages.

Chinese Office Action dated Jan. 20, 2023, pertaining to CN Patent Application No. 202080024474.3, 13 pgs.

Chinese Office Action dated Jun. 5, 2023, pertaining to CN Patent Application No. 202080023959.0, 9 pages.

BR Official Action dated Sep. 19, 2023, pertaining to BR Patent Application No. 112021018779-0, 8 pgs.

BR Official Action dated Aug. 25, 2023, pertaining to BR Patent Application No. 112021019191-7, 8 pgs.

Japanese Office Action dated Mar. 12, 2024, pertaining to JP Patent Application No. 2021-558636, 6 pgs.

Japanese Office Action dated Mar. 12, 2024, pertaining to JP Patent Application No. 2021-557937, 6 pgs.

Japanese Office Action dated Mar. 12, 2024, pertaining to JP Patent Application No. 2021-558637, 6 pgs.

US Non-Final Office Action dated May 2, 2024, pertaining to U.S. Appl. No. 17/599,852, 24 pgs.

US Non-Final Office Action dated May 2, 2024, pertaining to U.S. Appl. No. 17/599,970, 16 pgs.

\* cited by examiner

TRI-FUNCTIONAL LONG-CHAIN BRANCHED POLYOLEFIN

CROSS REFERENCE TO RELATED APPLICATIONS

This application claims priority to U.S. Provisional Patent Application No. 62/826,274, filed on Mar. 29, 2019, the entire disclosure of which is hereby incorporated by reference.

TECHNICAL FIELD

Embodiments of the present disclosure generally relate to polymer compositions having tri-functional long-chain branches and the process by which the polymer compositions are synthesized.

BACKGROUND

Olefin based polymers, such as polyethylene, are produced via various catalyst systems. Selection of such catalyst systems used in the polymerization process of the olefin-based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The amount of long-chain branching in a polyolefin affects the physical properties of that polyolefin. The effect of branching on properties of polyethylene depends on the length and the amount of branches. Short branches mainly influence the mechanical and thermal properties. As the branch length increases, the branches are able to form lamellar crystals that the mechanical and thermal properties diminish. Small amounts of long-chain branching can alter the polymer processing properties significantly.

To form long-chain branching, a vinyl or terminal double bond of a polymer chain is incorporated into a new polymer chain. Reincorporation of vinyl terminated polymers and introducing a diene comonomer are two mechanisms by which a vinyl group on a polymer strand is incorporated into a second polymer strand. Additionally, long-chain branching is induced via radicals. It is difficult to control the amount of branching in all three mechanisms. When using radicals or dienes to initiate long-chain branching, the branching may become too numerous, thereby causing gelling and reactor fouling. The reincorporation mechanism does not produce much branching, and branching can only occur after the polymer strand is produced, thereby further limiting the amount of branching that can occur.

SUMMARY

Embodiments of this disclosure include polymers comprising the polymerized product of ethylene, at least one diene comonomer, and optionally at least one $C_3$ to $C_{14}$ comonomer. The polymer comprises tri-functional long-chain branches resulting from the diene that occur at a frequency of at least 0.03 per 1000 carbon atoms of the polymer.

The diene has a structure according to formula (I):

(I)

In formula (I), X is $CR_2$, $SiR_2$ or $GeR_2$, wherein each R is independently $C_1$-$C_{12}$ hydrocarbyl or —H. In some embodiments, X in formula (I) is —$C(R)_2$—, and wherein each R is —H. In other embodiments, X in formula (I) is —$Si(R)_2$—, and wherein each R is $C_1$-$C_{12}$ alkyl.

Various embodiments of the process include polymerizations that occur in a solution polymerization reactor or a particle forming polymerization reactor such as a slurry reactor or a gas phase reactor, wherein the molecular or solid-supported catalyst is delivered to the reaction media or developed in the reaction media, wherein the reactor system is batch or continuous or a hybrid such as semi-batch, wherein the reactor residence time distribution is narrow such as in non-backmixed reactors or broad such as in backmixed reactor and series and recycle reactors.

DETAILED DESCRIPTION

Figure 1:
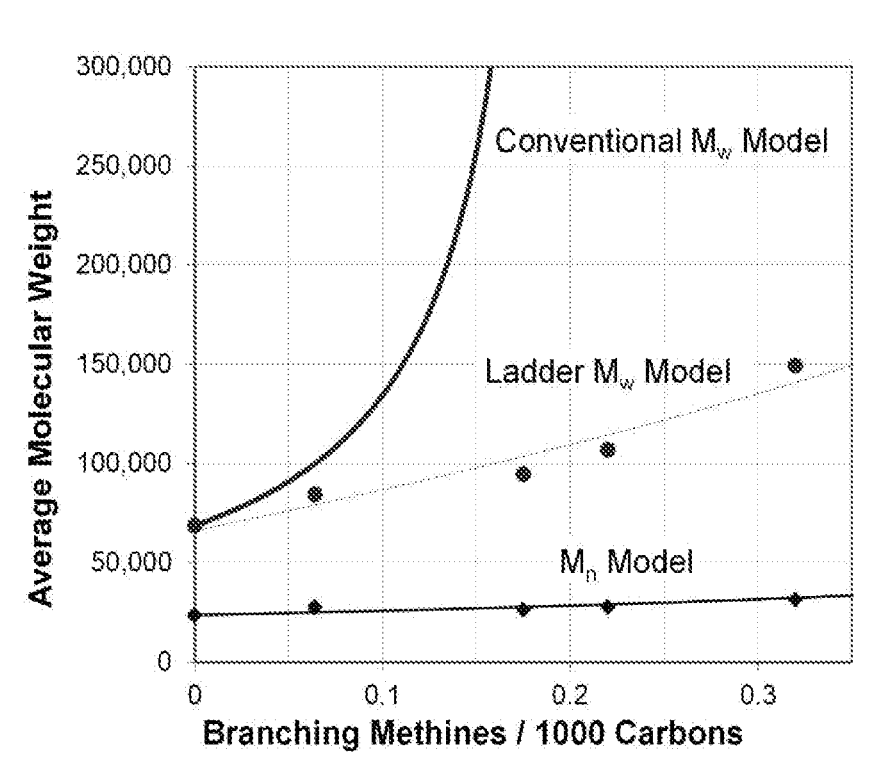
FIG. 1 is a graphical depiction of the molecular weight of a polymer as the number of branching methines per 1000 carbons.

Specific embodiments of a process for synthesizing polymer and polymers synthesized by the process of this disclosure will now be described. It should be understood that the process for synthesizing polymers of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50 mol % of units derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

"Ethylene-diene-based polymer" shall mean polymers comprising greater than 50 mol % of units derived from ethylene monomer and also include a small component of diene. The ethylene-diene-based polymer may optionally include units derived from one or more ($C_3$-$C_{12}$)α-olefins.

Embodiments of this disclosure include polymers comprising the polymerized product of ethylene, at least one diene comonomer, and optionally at least one $C_3$ to $C_{14}$ comonomer. The polymer comprises tri-functional long-chain branches resulting from the diene that occur at a frequency of at least 0.03 per 1000 carbon atoms of the polymer.

The diene has a structure according to formula (I):

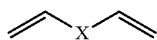

(I)

In formula (I), X is $CR_2$, $SiR_2$ or $GeR_2$, wherein each R is independently $C_1$-$C_{12}$ hydrocarbyl or —H. In some embodiments, X in formula (I) is —$C(R)_2$—, and wherein each R is —H. In other embodiments, X in formula (I) is —$Si(R)_2$—, and wherein each R is $C_1$-$C_{12}$ alkyl. In one or more embodiments, the diene is dimethyldivinylsilane.

In some embodiments, when R of formula (I) is $C_1$-$C_{12}$ alkyl, the $C_1$-$C_{12}$ alkyl is methyl, ethyl, 1-propyl, 2-propyl, 1-butyl, 2-butyl, 2-methylpropyl, 1,1-dimethylethyl, 1-pentyl; 1-hexyl, 1-heptyl, n-octyl, tert-octyl, nonyl, decyl, undecyl, or dodecyl. The term "$C_1$-$C_{12}$ alkyl" means a saturated straight or branched hydrocarbon radical of from 1 to 12 carbon atoms In various embodiments, the tri-functional long-chain branches of the polymer occur at a frequency of at least 0.05 per 1000 carbon atoms. In one or more embodiments, the tri-functional long-chain branches of the polymer occur at a frequency of at least 0.1 per 1000 carbon atoms. In various embodiments, the tri-functional long-chain branches of the polymer occur at a frequency of at least 0.2 per 1000 carbon atoms.

The polymers of this disclosure are produced via a process of synthesizing long-chain branched polymers. In one or more embodiments, the process includes contacting together one or more $C_2$-$C_{14}$ alkene monomers, at least one diene, optionally a solvent, and a multi-chain catalyst optionally in the presence of hydrogen, wherein the multi-chain catalyst comprises a plurality of polymerization sites and wherein the diene has a structure according to formula (I). At least two polymer chains of the $C_2$-$C_{14}$ alkene monomers are produced, each polymer chain polymerizing at one of the polymerization sites. Then, the long-chain branched polymers are synthesized by connecting the two polymer chains with the diene. The connecting or joining of the two polymer chains being performed in a concerted manner during the polymerization. The long-chain branched polymers have a ratio of tri-functional to tetra-functional long chain branches from 0.05:1 to 100:0. In one or more embodiments, the ratio of tri-functional to tetra-functional long chain branches is adjusted if the ratio deviates from a target ratio of tri-functional to tetra-functional long chain branches. The ratio is adjusted by altering an amount of $C_2$-$C_{14}$ alkene monomer feed, an amount of hydrogen feed, or combinations thereof.

In various embodiments the long-chain branched polymers have a ratio of tri-functional to tetra-functional long chain branches from 0.05:1 to 100:0.

In one or more embodiments, the tri-functional long chain branches are produced from the diene, wherein the tri-functional long chain branches occur at a frequency of at least 0.03 per 1000 carbon atoms.

The term "connecting" when in reference to "connecting two polymer chains" broadly means that the polymer chains are covalently linked.

In one or more embodiments, the ratio of tri-functional to tetra-functional long chain branches is adjusted if the ratio deviates from a target ratio of tri-functional to tetra-functional long chain branches. The ratio is adjusted by altering the amount of $C_2$-$C_{14}$ alkene monomer feed, the amount of hydrogen feed, the ratio of $C_2$-$C_{14}$ alkene monomer feed to hydrogen, or combinations thereof.

In some embodiments, the molar feed ratio of $C_2$-$C_{14}$ alkene monomer feed to hydrogen is from 100:0 to 1:1. In one or more embodiments, the feed ratio is from 80:1 to 25:1. In various embodiments, the feed ratio is from 70:1 to 30:1, from 60:2 to 10:1, or from 50:1 to 25.1.

The process of synthesizing polymers according to this disclosure is different from the conventional long-chain branching or prior "Ladder" branching, described in Application Nos. PCTUS2019/053524; PCTUS2019/053527; PCTUS2019/053529; and PCTUS2019/053537, each filed Sep. 27, 2019, and herein incorporated by reference in its entirety. The term "long-chain branching" refers to branches having greater than 100 carbon atoms. A "branch" refers to a portion of polymer that extends from a tertiary carbon atom. When the branch extends from a tertiary carbon atom, there are two other branches, which collectively could be the polymer strand from which the branch extends. In this disclosure, the branching is defined as tri-functional long-chain branching in that the branch point has three polymer chains emanating from it. Conventionally, long-chain branching (LCB) may occur naturally in the polymerization process, as shown in Scheme 1. Naturally occurring LCB can occur through vinyl termination of the polymer chain and reinsertion of the macromolecular vinyl creating a tri-functional long-chain branch. Depending on the degree of branching, a variety of methods can either determine LCB, such as nuclear magnetic resonance (NMR), or distinguish the effect of LCB in the polymer. For example, the effect of LCB is observed in shear flow in the van Gurp-Palmen analysis, also an increase of the shear viscosity at low angular frequencies and strength of the shear thinning behavior can be attributed to LCB. In extensional flow, the influence of LCB is usually identified in the degree of strain hardening or the strength of the melt and the maximum deformation achieved. A high level of natural LCB in a polymer is difficult to achieve due to the limited concentration of vinyl terminated polymers (maximum one per polymer chain) and the need to run to high ethylene conversion to ensure LCB formation. To ensure high conversion, there is a low ethylene concentration in the reactor, thus enabling a great amount of vinyl terminated polymers to be reinserted in a second polymer chain.

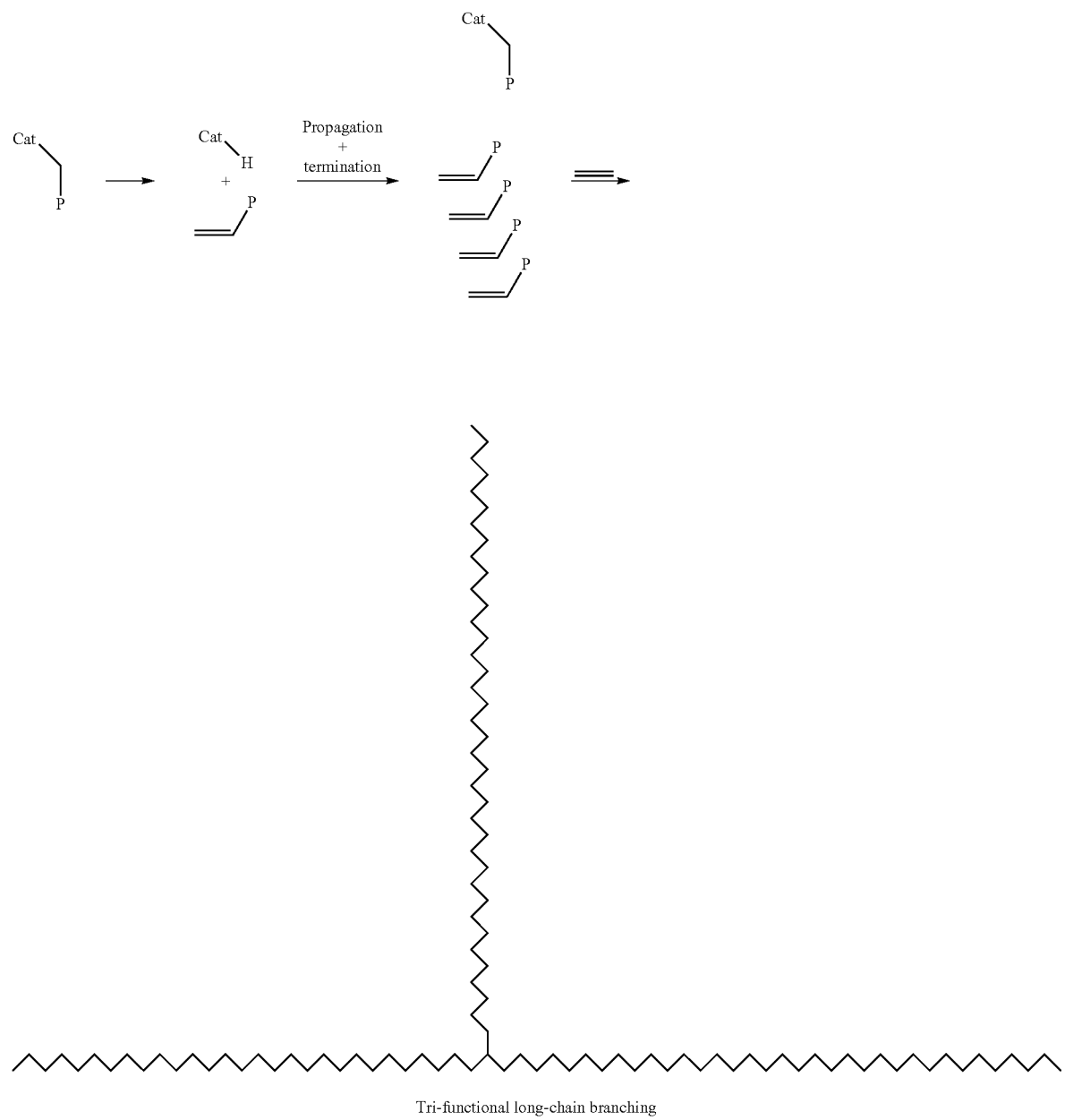

Scheme 1: Naturally occurring long-chain branching: Chain transfer event leading to vinyl terminated polymers Tri-functional long-chain branching In Scheme 1, "Cat" is the catalyst and "P" is the polymer chain.

There is minimal long-chain branching that forms through the naturally occurring branching. One way to enhance LCB is through the addition of $\alpha,\omega$-dienes to the polymerization system, whether it be in a radical, heterogeneous, or homogeneous process. In general, dienes add to the polymer chain in a similar manner to $\alpha$-olefins, but leave a pendant vinyl group, which can insert into a polymer chain a second time to create the LCB, as illustrated by Scheme 2. In general, the diene length does not matter, only that it can link two polymer chains together. In principle, the concentration of pendant vinyls can be controlled through the amount of diene added to the reactor. Thus, the degree of LCB can be controlled by the concentration of pendant vinyls.

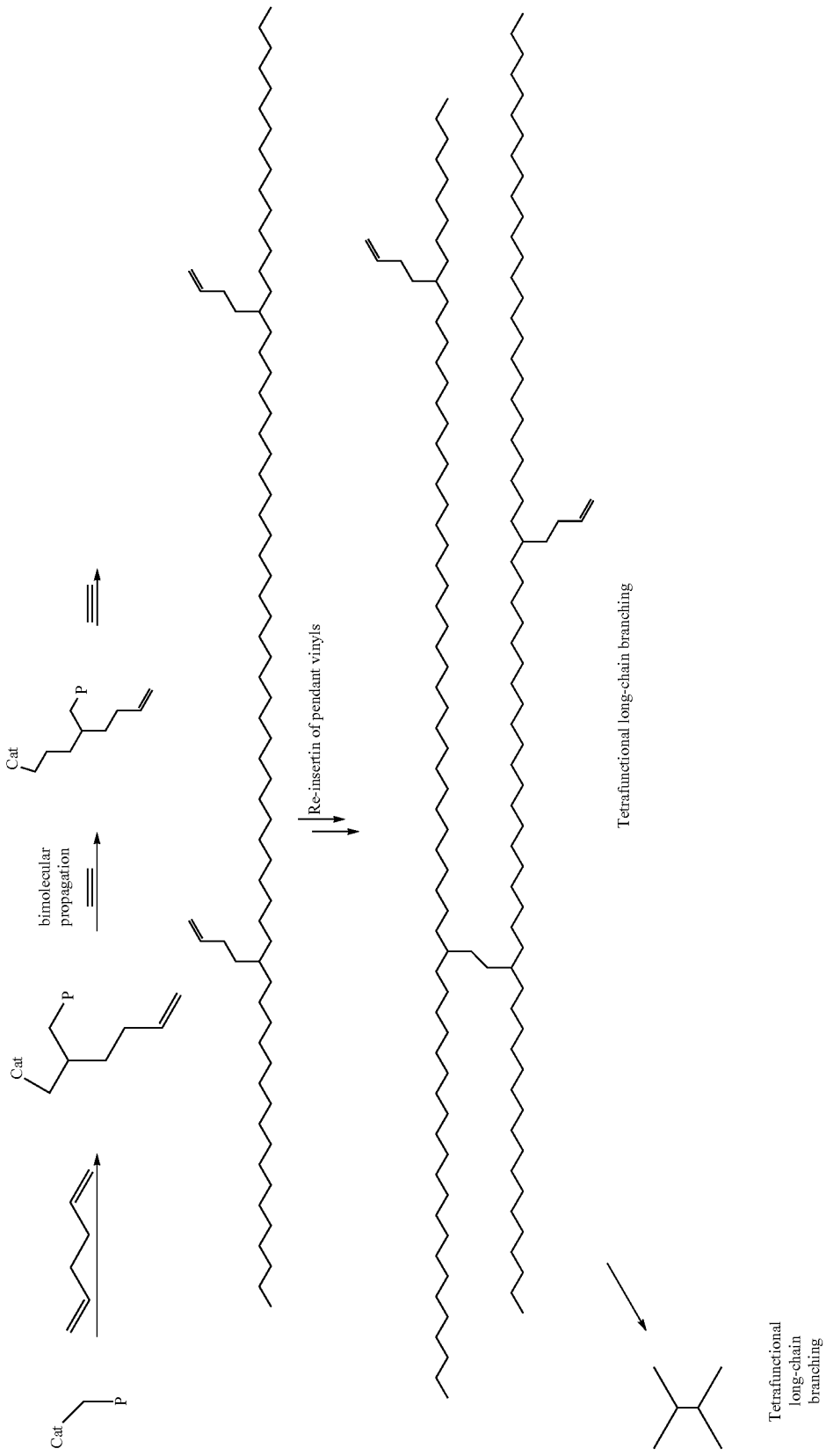

In Scheme 2, "Cat" is the catalyst; "P" is the polymer chain; and the diene in this example is 1,5-hexadiene.

The conventional process of incorporating dienes into a polymer synthesis system suffers from the fundamental flaw of gel formation or reactor fouling. The kinetic modeling, discussed in later paragraphs, may provide good predictive results that enable a better understanding into gel formation. For example, longer polymer chains have more inserted olefins, thus more inserted dienes, thus more pendant vinyls, implying that longer polymer chains will be more likely to re-insert into the catalyst to form a LCB. Thus, the longer polymer chains preferentially re-insert forming tetra-functional branches, which are even larger polymer molecules, and a gel problem results. As indicated in Scheme 2, a tetra-functional LCB has a short segment (number of carbons between the two double bonds of the diene), which bridges two long chains on each side of the short segment. A simulation of the weight average molecular weight ($M_w$) and number average molecular weight ($M_n$) as a function of branching is shown in FIG. 1 for polyethylene in a semi-batch reactor at constant pressure. In FIG. 1, $M_n$ only marginally increases as $M_w$ becomes infinite. As the $M_w$ increases to a number greater than 200,000 grams per mole (g/mol), the polymer gels, gelling occurs, or reactor fouling is present.

The term "gel" or "gelling" refers to a solid composed of at least two components: the first is a three dimensional cross-linked polymer and the second is a medium in which the polymer does not fully dissolve. When the polymer gels and does not fully dissolve, the reactor may become fouled with polymer gel.

The term "Ladder Branched" polymer refers to the polymer formed from the "Ladder Branching mechanism". As described in Scheme 2, the polymer has a tetra-functional long-chain branched structure. Additionally, the term "Ladder Branched" polymer and "Ladder Branching Mechanism" also refers to the tri-functional polymer and the polymerization processes that produce tri-functional long chain branched polymers.

The process to synthesize the tetra-functional long-chain branched polymer achieves long-chain branching and avoids gel formation or reactor fouling. Without intending to be bound by theory, it is believed that reactor fouling is avoided by reacting the two alkenes of the diene in a concerted fashion across two proximal polymer chains. For example and illustrated by Scheme 3, one alkene of the diene reacts before the second alkene, and the second alkene reacts before too many ethylene molecules are added to the polymer strand, thereby removing the close proximity the second alkene has to the reactive site. The reaction of the first alkene of the diene into one polymer and second alkene of the diene into an adjacent polymer chain before many ethylene monomers are inserted is referred to as a concerted addition of the diene into proximal polymer chains.

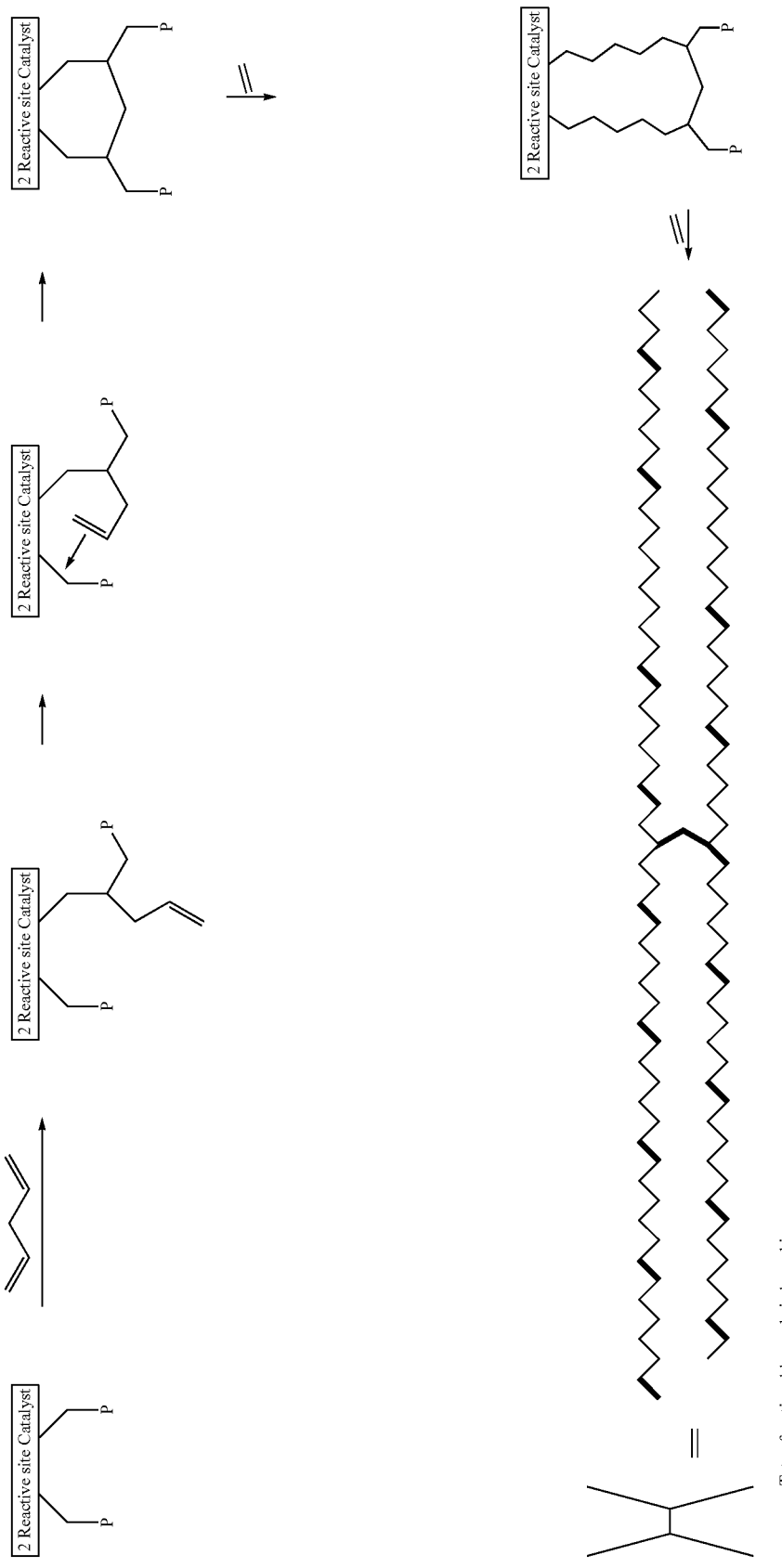
Scheme 3: Depiction of incorporating the diene in a concerted fashion (P is a polymer chain), also called teh tetra-functional "Ladder Branching" mechanism.
Tetra-functional long-chain branching Depending on catalysts or dienes, different intermediates can result from diene reactions. Previous work had shown the formation of tetra-functional LCBs from diene addition to dual-chain catalysts (Scheme 3) while formation of tri-functional long-chain branching is also possible. (Scheme 4).

molecule having two alkenes. A pictorial description of the mechanism is shown in Scheme 5, in which the catalyst center produces two polyolefin chains. Scheme 5 shows how a combination of diene bridging and chain transfer may create a diene "Ladder Branched" tri-functional polymer structure. The term diene "Ladder Branched" polymer refers

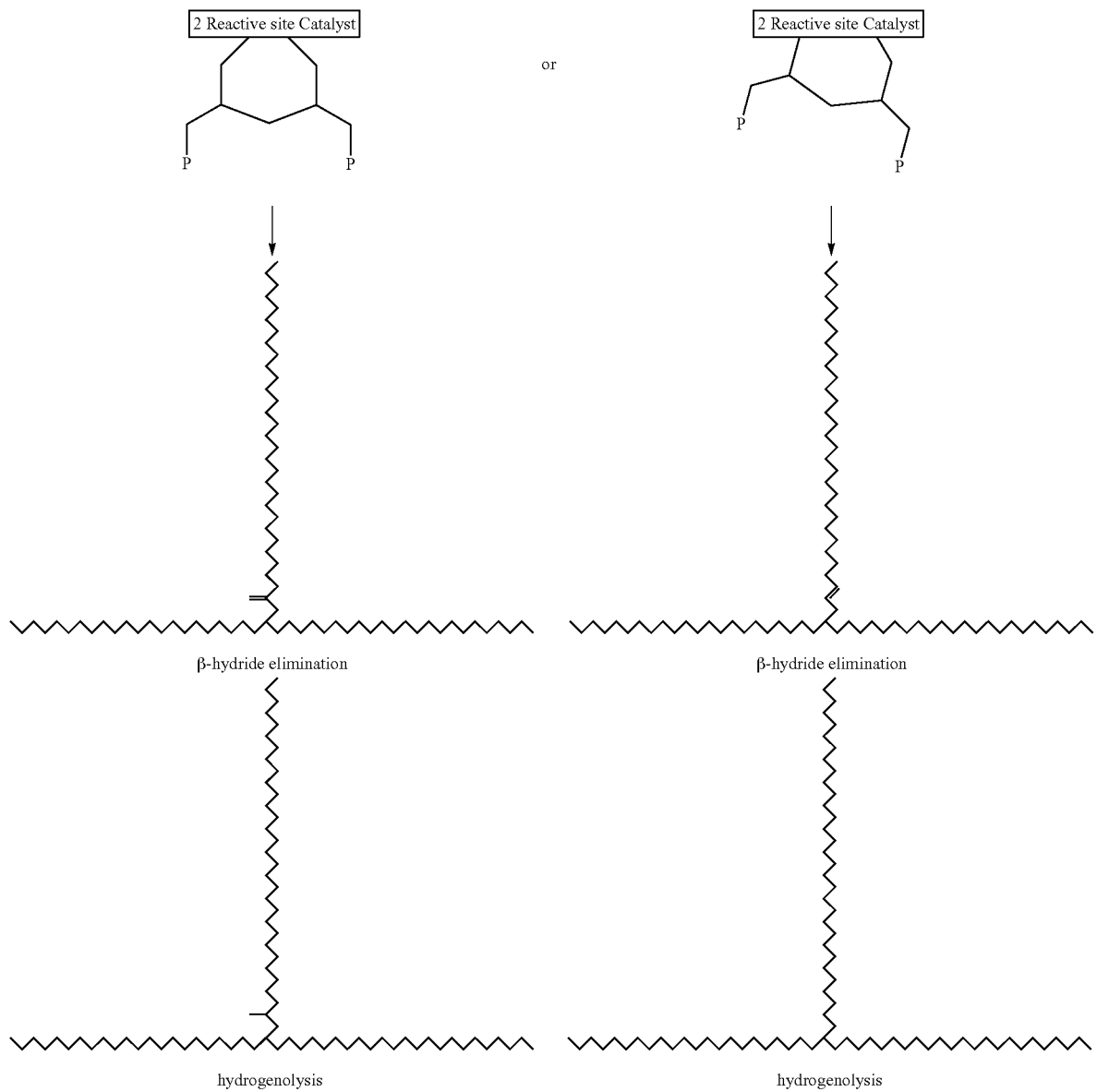

Scheme 4: Depiction of tri-functional long-chain branch formation from reaction of a diene.

Polymer strands are linear segments of a polymer, or more specifically a copolymer, which are optionally joined at the end(s) by branching junctures. For example, a tetra-functional branch juncture joins the ends of four polymer strands, as opposed to a tri-functional branch juncture, which joins the ends of three polymer strands as shown in Scheme 1.

While not intending to be bound by theory, a mechanism, as explained in this section, describes how a dual-chain catalyst can create a unique tri-functional bridged molecular architecture when polymerizing diene co-monomers under desired conditions. The term "diene" refers to a monomer or to the long-chain branching, in which a short chain or rung that includes one to twelve carbon atoms links two polymer chains together. As shown, the metal-ligand catalyst having at least two polymer chain sites, propagates two separate polymer chains. One alkene of the diene is incorporated into one of the sites of the catalyst, and it is believed that due to the close proximity of the propagation sites, the second alkene of the diene is then quickly incorporated into the second polymer chain, thereby forming a bridge or rung. This successive addition of diene is referred to as a "concerted" addition of the diene, distinguishing it from catalysts without two proximal chains where diene addition leads to a concentration of vinyl containing polymers in the reactor, which react at a later time. The term "rung" refers to the diene once it is incorporated into two separate polymer strands, thereby linking the strands together. The first and second polymer strands continue to propagate until the polymer transfers to another catalyst, the polymer is released from the catalyst, the catalyst dies, or another diene is added.

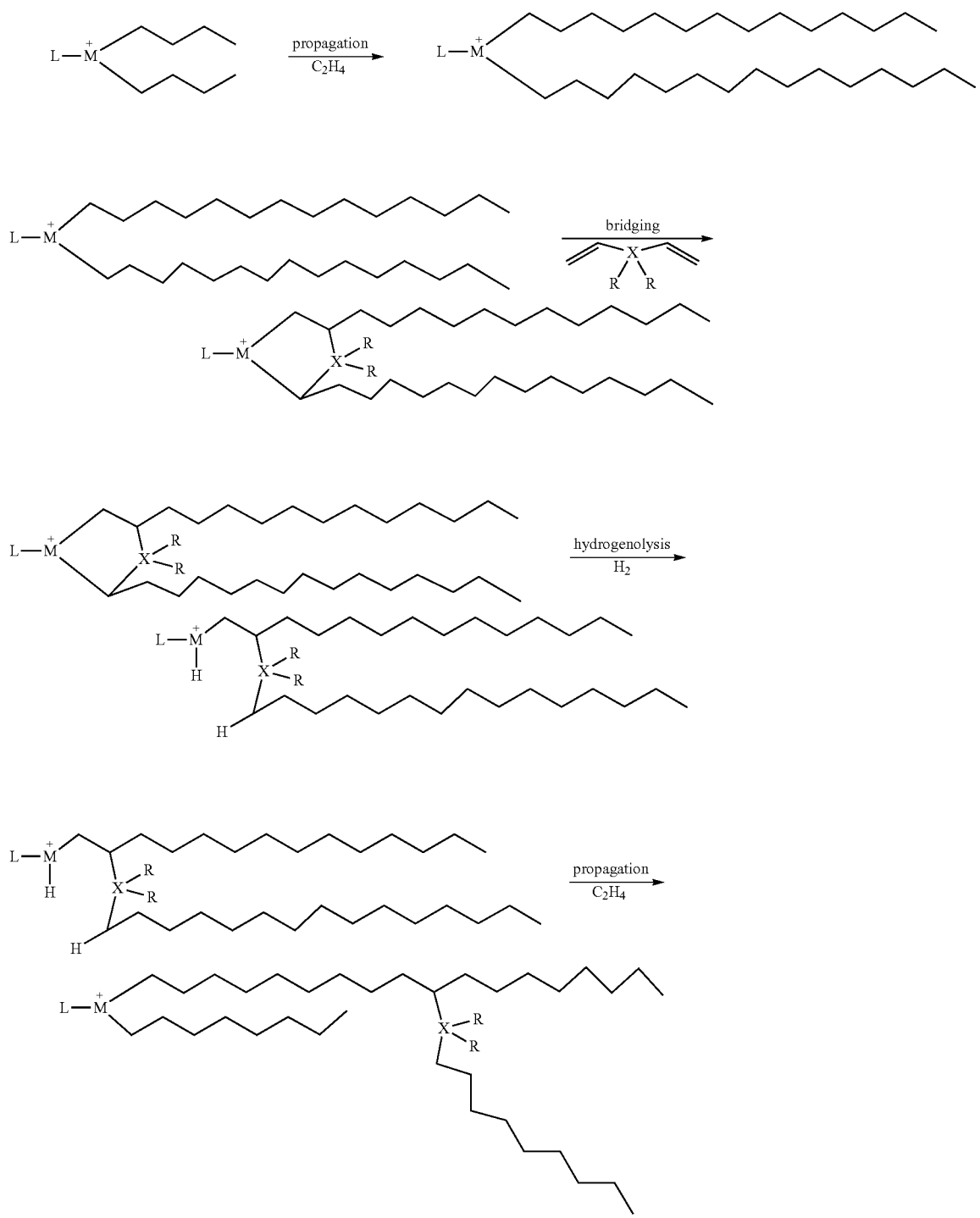

Scheme 5. Illustration of tri-functional "Ladder Branching" mechanism including the resulting molecular architecture. The metal-ligand catalyst are represented together by L—M$^+$.

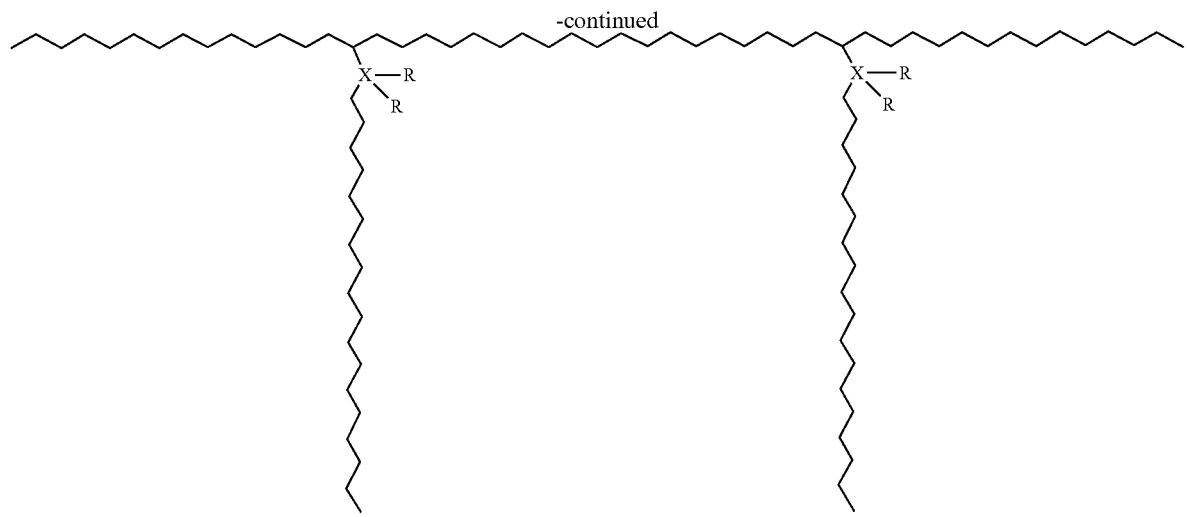

As depicted in Scheme 5, the tri-functional Ladder branching can occur upon the introduction of hydrogen gas. The introduction of hydrogen gas terminates the polymer chain at one of the polymerization cites of the multi-chain catalyst. Upon termination, the polymer chain disconnects, thus yielding a tri-functional polymer. The polymer of this disclosure includes tri-functional long chain branches that result from the diene of formula (I).

In one or more embodiments, the ratio of tri-function to tetra-functional branches is controlled via adjusting the ethylene/hydrogen ratio in the reactor or other reactor conditions such as temperature. In some embodiments, the ratio of tri-functional to tetra-functional long chain branches is greater than 0.1:1 to about 100:0.

Without intending to be bound by theory, it is believed that the molecular weight distribution associated with these proposed kinetics is inherently stable at high branching levels when the diene bridging reaction is the sole source of branching. The molecular weight distribution (MWD) is defined by the weight average molecular weight divided by the number average molecular weight ($M_w/M_n$). The inherent stability of the MWD means that the weight average molecular weight ($M_w$) increases only moderately even at high branching levels, which is in contrast to conventional diene comonomer branching technology wherein $M_w$ and $M_w/M_n$ become infinite at moderate tetra-functional branching levels.

The combination of a multi-chain catalyst and diene influences the amount and type of branching. Embodiments of the present disclosure are directed to controlling polymer properties such as: 1) the use of multiple diene species, 2) the use of multiple multi-chain catalyst species, 3) the combination of polymerization environments including multiple reactors zones or a gradient of zones, or 4) the control and combination of different types of long-chain branching, for example, tri-functional and tetra-functional long-chain branching.

Although, using multiple catalysts, including single-chain catalysts, may allow conventional branching. The use of multiple dienes species also includes those dienes which do not create branches or tend to result in "conventional" LCB. The process of synthesizing polymers according to this disclosure is different from the conventional long-chain branching. The term "long-chain branching" refers to branches having greater than 100 carbon atoms. The term "branch" refers to a portion of polymer that extends from a tertiary carbon atom. When the branch extends from a tertiary carbon atom, there are two other branches, which collectively could be the polymer chain from which the branch extends. Long-chain branching (LCB) may occur naturally in the polymerization process, as shown in Scheme 1. This may occur through termination of the polymer chain and reinsertion of the macromolecular vinyl creating a tri-functional long-chain branch.

In one or more embodiments, the process for polymerizing the long-chain branched polymer includes a catalyst with at least two active sites in close proximity (multi-chain catalysts). Close proximity includes a distance of less than 8 angstroms (Å), less than 6 Å, or approximately 5 Å.

It is well-known that modern computational techniques can reproduce known experimental structures to good accuracy as a way to estimate distances between chains for a catalyst. The diene structure according to formula (I), where X is —C(R)$_2$—, —Si(R)$_2$—, or —Ge(R)$_2$—, where each R is independently, a hydrogen or hydrocarbyl group, allows one to estimate the size of the diene. The end-to-end distance of the diene according to formula (I), in which X is —Ge(R)$_2$—, diene is approximately 7.5 Å. Therefore, polymerization sites of the multi-chain may be within 8 Å or in the case of bimetallic catalysts, the two metals to be within 8 Å.

For a heterogeneous system, one may estimate surface concentration of metals which are often measured in metal atoms per nanometer squared (M/nm$^2$). This surface coverage provides an estimate of accessible metals on the surface which if evenly dispersed may be converted to an M-M distance, which reflects the distance between the polymer chains. For an extended surface, 1 metal/nm$^2$ leads to a distance of 10 Å between the metal atoms. At 8 Å, one can determine the coverage at 1.5 metal/nm$^2$.

Examples of catalysts having at least two active sites, wherein the active sites are in close proximity include, but are not limited to: bimetallic transition metal catalysts; heterogeneous catalysts; dianionic activators with two associated active catalysts; a ligated transition metal catalyst with more than one propagating polymer chain; a group IV olefin polymerization catalyst including monoanionic groups, bidentate monoanionic groups, tridentate monoanionic groups, or a monodentate, bidentate, or tridentate monoanionic groups with external donors.

The catalysts in Table 1 are illustrative embodiments of the classes of catalysts previously described and specific catalysts contemplated. The examples in Table 1 are not intended to be limiting; rather they are merely illustrative and specific examples for the classes of catalyst previously mentioned.

TABLE 1

Catalysts with more than one active site in close proximity

| Class | Illustrative | Specific |
|---|---|---|
| Bimetallic Catalysts | 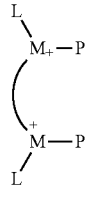 | 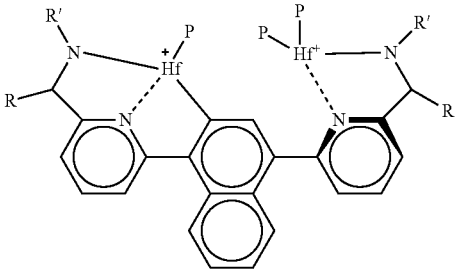 |
| | 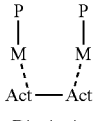<br>Dianionic Activator associated with two active catalyst | 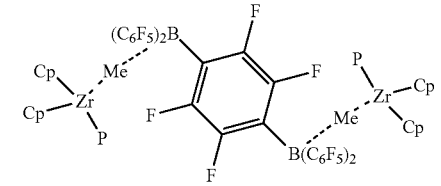 |
| Heterogeneous and Supported Catalysts | 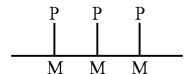<br>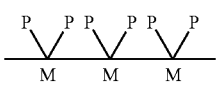<br>Heterogeneous Catalyst | |
| Group IV Olefin Polymerization Catalyst | 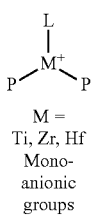<br>M = Ti, Zr, Hf<br>Mono-anionic groups | 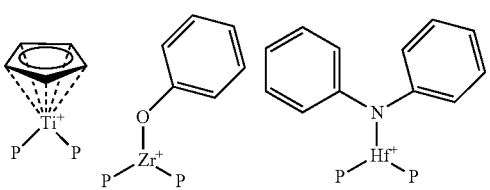 |
| | 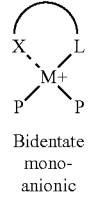<br>Bidentate mono-anionic groups | 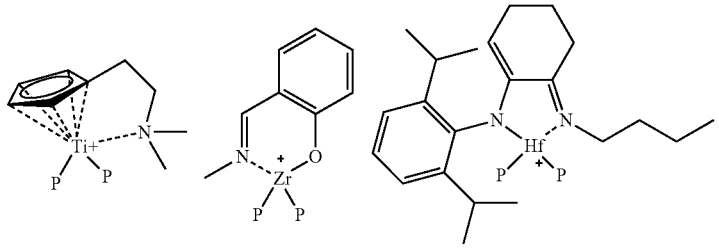 |

While not intending to be bound by theory, a mechanism, as explained in this section, describes how a dual-chain catalyst can create a unique tri-functional bridged molecular architecture when polymerizing diene co-monomers under desired conditions. The term "diene" refers to a monomer or molecule having two alkenes. A pictorial description of the mechanism is shown in Scheme 5, in which the catalyst center produces two polyolefin chains. Scheme 5 shows how a combination of diene bridging and chain transfer may create a diene "Ladder Branched" tri-functional polymer structure. The term diene "Ladder Branched" polymer refers to the long-chain branching, in which a short chain or rung links two polymer chains together. As shown, the metal-ligand catalyst having at least two polymer chain sites propagates two separate polymer chains. One alkene of the diene is incorporated into one of the sites of the catalyst, and it is believed that due to the close proximity of the propagation sites, the second alkene of the diene is then quickly incorporated into the second polymer chain, thereby forming a bridge or rung. This successive addition of diene is referred to as a "concerted" addition of the diene, distinguishing it from catalysts without two proximal chains where diene addition leads to a concentration of vinyl containing polymers in the reactor, which react later. The term "rung" refers to the diene once it is incorporated into two separate polymer strands, thereby linking the strands together. The first and second polymer strands continue to propagate until the polymer transfers to another catalyst, the polymer is released from the catalyst, the catalyst dies, or another diene is added.

In one or more embodiments, the polymer of this disclosure is an ethylene-based copolymer comprising at least 50 mol % ethylene. In this disclosure, "ethylene-based polymer" refer to homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene-based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene.

Kinetics

A mathematical model was previously derived for tetra-functional "Ladder Branched" long-chain branching and described in Application Nos. PCTUS2019/053524; PCTUS2019/053527; PCTUS2019/053529; and PCTUS2019/053537, each filed Sep. 27, 2019. Here, a model is derived for tri-functional "Ladder Branched" long-chain branching. The mathematical model will also be used to establish claims metrics and ranges. The mathematical model of the branched architecture as described in this disclosure may be derived from a kinetics description of the proposed mechanism of branching. This model is based upon several assumptions to facilitate mathematical simplicity, but these assumptions are not intended to limit the scope of this disclosure. The assumptions follow common industrial applications of non-living addition of copolymers as well as additional assumptions specific to the assumed diene branching mechanism. The common assumptions made include: (1) propagation is much faster than chain transfer, therefore average chain length is much greater than one monomer; (2) only a single pure catalyst species is active; (3) the catalyst center makes many chains during its lifetime, and therefore the chain lifetime is a small fraction of the reaction or residence time; (4) co-polymerization may be approximated by a homopolymerization model when there is negligible composition drift.

Kinetics for Diene Tri-Functional "Ladder Branching" Theory

Model Derivation. The first step in deriving a model of the system is to write the kinetics in symbolic form, indicating the effect of each reaction on the molecular attribute(s) of interest. It is standard practice to use indices to indicate the number of repeat units associated with a growing (living) or dead polymer chain. Furthermore, it is also recognized that addition copolymer molecular architectures can be accurately described by homopolymer kinetics and models when the homopolymer rate constants are regarded as effective composite copolymerization rate constants (Tobita and Hamielec, *Polymer* 1991, 32 (14), 2641).

The kinetic are written below for a simple addition polymerization with a dual site catalyst where $P_{n,m}$ is an active catalyst center growing two polymer molecules, the left molecule having n repeat units and the right molecule having m repeat units. Prior work has studied the formation of tetra-functional branches from diene bridging across two growing polymer molecules. The kinetics below consider diene bridging for which tri-functional ($b_3$) branches or bi-functional linkages ($b_2$) are assumed to be created from dienes bridging across the two growing molecules. Dienes reactions such as cyclization or single insertion are considered unproductive and are ignored in the kinetics scheme.

Kinetics for Dienes Tri-Functional and Bi-Functional Ladder Branching Theory a) Propagation (left) $P_{n,m}+M \rightarrow P_{n+1,m}$ $k_p$, (L/mole/sec)
   (right) $P_{n,m}+M \rightarrow P_{n,m+1}$ $k_p$, (L/mole/sec)
b) Chain Transfer (left) $P_{n,m}+A \rightarrow P_{0,m}+D_n+kc$ $k_{tra}$, (L/mole/sec)
   (right) $P_{n,m}+A \rightarrow P_{n,0}+D_m+kc$ $k_{tra}$, (L/mole/sec)
c) Diene Bridging (left) $P_{n,m}+D \rightarrow P_{n+m,0}+b_3$ 2 $k_d$, (L/mole/sec)
   (right) $P_{n,m}+D \rightarrow P_{0,n+m}+b_3$ 2 $k_d$, (L/mole/sec)
   $P_{n,m}+D \rightarrow P_{0,0}+D_{n+m}+b_2$ 4 $k_g$, (L/mole/sec)
d) Re-initiation $P_{n,0}+M \rightarrow P_{n,1}$ fast reaction
   $P_{0,m}+M \rightarrow P_{1,m}$ fast reaction
   $P_{0,0}+2M \rightarrow P1,1$ fast reaction The kinetics are written for each of the two polymer molecules growing on the catalyst, identified as left and right. The outcome of propagation is the incremental increase in a molecule size by one repeat unit, whether it be the left side ($P_{n+1,m}$) or the right side ($P_{n,m+1}$). The chain transfer reactions detach a chain from the catalyst and generate a dead polymer molecule from wither the left ($D_n$) or right ($D_m$) side. Additional simple chain transfer type reactions such as hydrogenation or beta hydride elimination do not add complexity to the model.

The diene bridging reaction $k_d$ is written for each catalyst side and each rate uses a factor of 2 because of the two reactive groups on a diene (D). The diene bridging reaction $k_g$ uses a factor of 4 in its rate because it is written once for both (2) sides and a diene (D) has two reactive sites. Therefore, the diene consuming kinetics have rate constants which are defined on a group-wise basis rather than a molecular basis.

It is standard practice to assume that the re-initiation of polymer chains occurs very quickly and relatively infrequently in relation to propagation. By assuming instantaneous re-initiation the species $P_{n,0}$, $P_{0,m}$, and $P_{0,0}$ are essentially removed from consideration in the polymer population.

Population Balances and Rates. The kinetics scheme can be rendered into a series of balance equations that describe how each reaction effects the molecular architecture. In the writing of these balances it is convenient to use a shorthand nomenclature to represent each reaction rate. These rate groups are defined below. The kinetics model can be extended to include other chain transfer reactions, such as with hydrogen ($k_{trh}$) and beta hydride elimination ($k_b$) merely by expanding the definition of the transfer term, such as $\Omega = k_{tra}A + k_{trh}H_2 + k_b$.

Kinetic rate groups defined: $\Omega = k_{tra}A$  $\Psi = k_d$ D  $\Pi = k_g$ D  $\Phi = k_p$ M A discrete population balance for growing polymer ($P_{n,m}$) molecules and dead polymer molecules ($D_n$) is written below for molecule sizes of $n \geq 1$ and $m \geq 1$, using the kinetics groups defined above. These balances define the rates of change of a molecular population versus size, and could be amended to include additional convection terms were the balances to be applied to a specific reactor environment or type. The $\delta_k$ terms are used in these discrete balances to designate that a term is included only when $k=0$.

$$R_{P_{n,m}} = \Phi(P_{n-1,m} + P_{n,m-1} - 2P_{n,m}) - (2\Omega + 4\Psi + 4\prod)P_{n,m} +$$
$$\delta_{m-1}(2\Psi V_n + \Omega L_n) + \delta_{n-1}(2\Psi V_m + \Omega R_m) + \delta_{n-1}\delta_{m-1}4\prod \xi_{0,0}$$

$$R_{D_n} = \Omega(R_n + L_n) + 2\prod \sum_{m=1}^{n-1}(P_{m,n-m} + P_{n-m,m}) = 2\Omega L_n + 4\prod V_n$$

where: $\delta_i =$ $$\begin{cases} 0, & i \neq 0 \\ 1, & i = 0 \end{cases} \quad V_n = \sum_{m=1}^{n-1} P_{n-m,m} = \sum_{m=1}^{n-1} P_{m,n-m} \quad L_n = \sum_{s=1}^{\infty} P_{n,s} = R_n = \sum_{s=1}^{\infty} P_{s,n}$$

Other important population balances can be derived from the above, such as for the left side ($L_n$) and right side ($R_n$) growing polymer subspecies distributions, and the convolution distribution ($V_n$). The left and right side growing polymer subspecies distributions are equal, due to symmetry imposed in defining the kinetics scheme.

$$R_{L_n} = \Phi(L_{n-1} - L_n) - (\Omega + 4\Psi + 4\Pi)L_n + 2\Psi V_n + \delta_{n-1}(\Omega + 2\Psi + 4\Pi)\xi_{0,0}$$

$$R_{V_n} = 2\Phi(V_{n-1} - V_n) - (2\Omega + 4\Psi + 4\Pi)V_n + 4\Psi V_{n-1} + 2\Omega L_{n-1} + \delta_{n-2}4\Pi\xi_{0,0}$$

With $\xi_{0,0}$ as the total active catalyst concentration, where:

$$\xi_{0,0} = \sum_{n=1}^{\infty}\sum_{m=1}^{\infty} P_{n,m} = \sum_{n=1}^{\infty} R_n = \sum_{n=1}^{\infty} L_n = \sum_{n=2}^{\infty} V_n$$

The first step in rendering a usable model is to implement the "steady-state assumption" on the growing polymer species distributions by setting the relevant polymer subspecies rates ($R_{P_{n,m}}$, $R_{L_n}$, $R_{V_n}$) to zero. This is a very common assumption in addition polymerization modeling when the growing chain lifetime is a very small fraction of the time period of interest. In most non-living commercial polymerizations of this type, chain lifetime is typically much less than a second while a reactor residence time is at least several minutes.

Method of Moments for Prediction of MWD Averages

A model describing the moments of the polymer species chain length distributions can often be derived from population balances resulting from a kinetics scheme. A moment based model is useful in predicting molecular weight averages and polydispersity index but in general does not describe smaller nuances in MWD such as bimodality, peak MW, and tailing. The method of moments entails the definition of various polymeric subspecies chain length distribution moments such as those below. The bulk polymer moments ($\lambda_i$) reflect bulk polymer properties and solution of a model of bulk moments generally requires solution of various living polymer moments.

Living Polymer Moments:

$$\xi_{i,j} = \sum_{n=1}^{\infty}\sum_{m=1}^{\infty} n^i m^j P_{n,m}$$

Bulk Polymer MWD Moments:

$$\lambda_i = \sum_{n=1}^{\infty} n^i (D_n + L_n + R_n)$$

The rate of change of the bulk moments is easily derived from the dead polymer population balance, considering that the rates of changes of lives species were assumed to be zero.

$$R_{\lambda_i} = \sum_{n=1}^{\infty} n^i R_{D_n} = 2\Omega \sum_{n=1}^{\infty} n^i L_n + 4\Pi \sum_{n=1}^{\infty} n^i V_n$$

Any skilled polymer reaction engineer would be expected to be capable of deriving a moments model from a series of population balances. Rates of change of the leading bulk polymer moments ($\lambda_0$, $\lambda_1$, $\lambda_2$) are given below with negligible terms removed after imposing the assumption that kinetic chains are long, and therefore $\Phi \gg \Omega$, $\Phi \gg \Psi$, $\Phi \gg \Pi$.

$R_{\lambda_0} = (2\Omega + 4\Pi)\xi_{0,0}$  $R_{\lambda_1} = (2\Omega + 8\Pi)\xi_{1,0}$  $R_{\lambda_2} = (2\Omega + 8\Pi)\xi_{2,0} + 8\Pi\xi_{1,1}$ Evaluation of the rates of change of these bulk moments requires a number of living polymer subspecies moments. These live polymer moments are algebraic quantities because of the "steady-state assumption" and are given below. Additional live moments are required when higher bulk moments such as $\lambda_3$ are predicted.

$$\xi_{1,0} = \xi_{0,1} = \frac{\Phi \xi_{0,0}}{\Omega + 4\Pi} \xi_{1,1} = \frac{\Phi(\xi_{1,0} + \xi_{0,1})}{2\Omega + 4\Psi + 4\Pi} \quad \xi_{2,0} = \xi_{0,2}\frac{2\Phi \xi_{1,0} + 4\Psi \xi_{1,1}}{\Omega + 4\Pi}$$

The instantaneous number and weight average chain lengths ($DP_n$, $DP_w$) are provided below, after evaluation algebraic simplification of the moment rates. Of course, the average molecular weights ($M_n$, $M_w$) are equal to the average chain lengths multiplied by the apparent monomeric repeat unit weight in g/mole.

$$DP_n = \frac{R_{\lambda_1}}{R_{\lambda_0}} = \frac{\Phi}{\Omega + 2\Pi}$$

-continued $$DP_w = \frac{R_{\lambda_2}}{R_{\lambda_1}} = \frac{2\Phi(\Omega + 4\Psi + 4\Pi)}{(\Omega + 4\Pi)(\Omega + 2\Psi + 2\Pi)}$$

Branching Metrics

The expression of the model is further simplified by a few substitutions, such as the diene-free average linear kinetic chain length $DP_{no}$ being equal to $\Phi/\Omega$. Also, the model can be further simplified by expressing it in terms of dimensionless instantaneous branching metrics, such as $F_b$ which is the fraction of diene junctures that are bi-functional. The use of $F_b$ as a metric is reasonable since at varying diene levels one might expect $F_b$ to be fairly constant, but certainly vary with catalyst selection and likely vary with reaction conditions.

Fraction of Bi-Functional Diene Junctures

$$F_b = \frac{R_{b_2}}{R_{b_2} + R_{b_3}} = \frac{\Pi}{\Pi + \Psi}$$

An additional metric is required to describe the relative level of branching and two options are resented here. One preferable option is to use $R_c$, which is the ratio of diene junctures to original polymer molecules. One advantage of $R_c$ is that it is simply a scaling for dienes junctures and is expected to increase proportionally with dienes. A disadvantage of $R_{kc}$ is that original kinetic chain length or concentration is generally only directly available when a series of data are measured which includes a zero dienes branching level.

Diene Junctures Per Original Kinetic Chain

$$R_{kc} = \frac{R_{b_2} + R_{b_3}}{R_{kc}} = \frac{2\Pi + 2\Psi}{\Omega}$$

The metric $R_n$ is an alternative to the branching metric $R_{kc}$, where $R_n$ is the ratio of dienes junctures to polymer molecules. The use of $R_n$ to analyze data is facilitated by the measurability of chain length or concentration through GPC measurement of number average molecular weight. However, $R_n$ is not simply proportional to dienes since bi-functional junctures affect the number of polymer molecules. In the case of zero bi-functional coupling ($F_b=0$) the two metrics $R_{kc}$ and $R_n$ are identical.

Diene Junctures Per Polymer Molecule

$$R_n = \frac{R_{b_2} + R_{b_3}}{R_{\lambda 0}} = \frac{2\Pi + 2\Psi}{\Omega + 2\Pi}$$

The average chain lengths and molecular weights are described below with polydispersity, where the dienes-free-polydispersity index is 2 due to the assumed simplicity and ideality of the kinetics.

$$\frac{DP_n}{DP_{no}} = \frac{M_n}{M_{no}} = \frac{1}{1 + F_b R_{kc}} = 1 F_b R_n$$

$$\frac{DP_w}{DP_{wo}} = \frac{M_w}{M_{wo}} = \frac{1 + 2R_{kc}}{(1 + R_{kc})(1 + 2F_b R_{kc})} = \frac{(1 - F_b R_n)(1 + 2R_n - F_b R_n)}{(1 + F_b R_n)(1 + R_n - F_b R_n)}$$

$$Z_p = \frac{DP_w}{DP_n} = \frac{M_w}{M_n} = \frac{2(1 + 2R_{kc})(1 + F_b R_{kc})}{(1 + R_{kc})(1 + 2F_b R_{kc})} = \frac{2(1 + 2R_n - F_b R_n)}{(1 + F_b R_n)(1 + R_n - F_b R_n)}$$

Several simple conclusions can be made from the above model, once it has been rendered as a function of physically significant parameters like $F_b$, $R_{kc}$ and $R_n$. For example, the model shows that weight average chain length ($DP_w$) or molecular weight ($M_w$) can only increase a maximum of twofold with the incorporation of dienes. Any bi-functional linkages is expected to lower $DP_n$ or $M_n$, and moderates any increase in $DP_w$ or $M_w$. Starting with a zero-dienes polydispersity of 2, the polydispersity ($Z_p$) at high tri-functional branching level is at most 4, and is moderated by the incidence of any bi-functional linkages.

Figure 2:
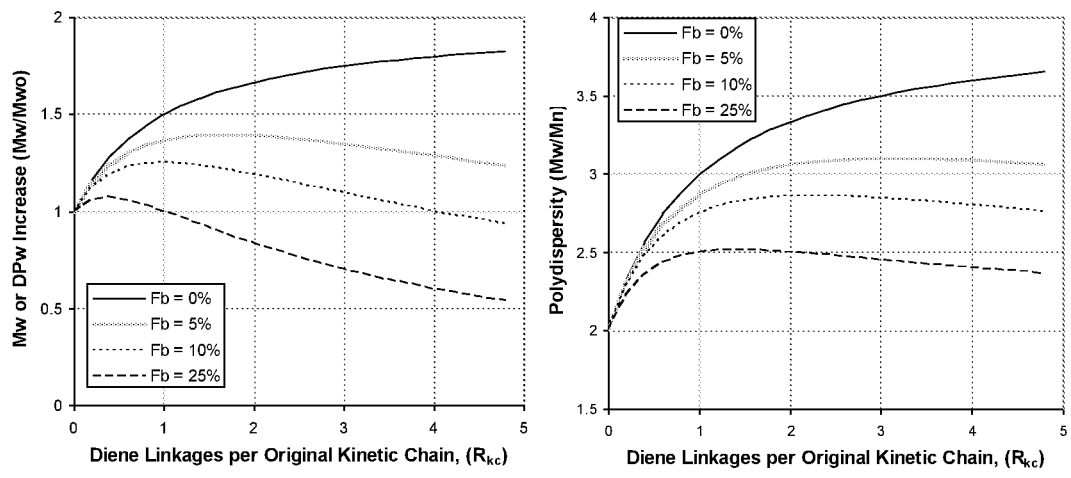
FIG. 2A is a plot of molecular weight increase versus diene linkages.
FIG. 2B is a plot of polydispersity vs. dienes linkages.

FIG. 2 demonstrates the effects of dienes juncture functionality ($F_b$) on the molecular weight and polydispersity of polymers. The model clearly shows that pure tri-functional dienes bridging has a limited twofold potential effect on molecular weight and polydispersity and that the incremental effect diminishes at high dienes levels such as $R_{kc}>3$. Furthermore, if a modest bi-functional dienes juncture level of $F_b=5\%$ or 10% is expected then it is possible that experimental data might not even prove a positive correlation between dienes level and $M_w$.

Model of the Complete MWD Curve

A times it is possible to solve population balances for a molecular weight distribution curve. Explicit algebraic solutions are normally only available for instances of no spatial or temporal variations in reaction rates, such as assumed in this case. Of particular interest is the polymer distribution function $D_n$, which was previously used to render model equations for the moments of the bulk MWD. Likewise, the instantaneous bulk polymer chain length distribution, $X_n$, can be expressed as follows

Instantaneous Bulk Chain Length Distribution:

$$x_n = \frac{R_{D_n}}{R_{\lambda 0}} = \frac{2\Omega L_n + 4\Pi V_n}{(2\Omega + 4\Pi)\xi_{0,0}}$$

Due to the assumption of long chains it is possible to treat all species distributions ($X_n$, $D_n$, $L_n$, $V_n$, etc) as if they were continuous rather than discrete functions. The steady-state polymer species population balances can be closely approximated by differential equations in the continuous variable n when difference terms are replaced by derivatives. For example, the steady-state population balance for $L_n$ contains the difference term $L_n - L_{n-1}$ which is replaced by the derivative as shown below.

$$\Phi(L_n - L_{n-1}) \sim \Phi \frac{dL(n)}{dn}$$

Similar replacements result in the following series of ordinary differential equations (ODEs) which can be integrated to yield the chain length distributions of the various defined live subspecies distributions L(n) and V(n). The model is summarized below as an initial value problem, where the chain length distribution functions are assumed to start at n=0. The lower limit of n=0 for the distribution functions is chosen for mathematical simplicity alone and ultimately makes no significant impact on model predictions when high polymers are formed.

$$\Phi \frac{dL(n)}{dn} = -(\Omega + 4\Psi + 4\Pi) L(n) + 2\Psi V(n) \quad L(0) = Lo$$

$$2\Phi \frac{dV(n)}{dn} = -(2\Omega + 4\Psi) V(n) + 2\Omega L(n) \quad V(0) = Vo$$

Analytical solutions exits for the continuous distributions functions L(n) and V(n) and these functions can be used to render a function for the continuous bulk polymer chain length distribution (X(n)).

$$X(n) = \frac{2 \Omega L(n) + 4 \Pi V(n)}{(2\Omega + 4\Pi)\xi_{0,0}}$$

The solution for X(n) is somewhat complicated but can be easily expressed as follows:

$$X(n) = e^{-\alpha n/DP_{no}}\left(A_1 \text{Cosh}\left[\frac{\beta n}{DP_{no}}\right] + A_2 \text{Sinh}\left[\frac{\beta n}{DP_{no}}\right]\right)$$

with the following assignments for terms:

$$\frac{\sqrt{2\Psi\Omega + (2\Psi + \Pi)^2}}{\Omega}$$

$$A_1 = \frac{\Omega^2 + 2\Psi\Omega + 4\Pi\Omega + 4\Pi^2}{\Omega(\Omega + 2\Pi)}$$

$$A_2 = \frac{(\Omega + 2\Psi)(4\Pi^2 - 2\Psi\Omega) + (\Omega - 2\Psi)\Pi\Omega + 4\Pi^3}{\Omega(\Omega + 2\Pi)\sqrt{2\Psi(\Omega + 2\Psi) + 4\Pi\Psi + \Pi^2}}$$

Alternate assignments for the X(n) function terms can be rendered using the branching metrics ($F_b$, $R_{kc}$, $R_n$) applied earlier to the instantaneous average chain length and molecular weight model. The X(n) terms below are stated as a function of $F_b$ and $R_{kc}$ and can be converted to use $R_n$ by applying the substitution $R_{kc}=R_n/(1-F_b R_n)$.

$$\alpha = 1 + R_{kc} + 1/2 F_b R_{kc}$$

$$\beta = 1/2\sqrt{R_{kc}(4(1 - F_b) + R_{kc}(2 - F_b)^2)}$$

$$A_1 = \frac{1 + R_{kc} + F_b R_{kc} + (F_b R_{kc})^2}{1 + F_b R_{kc}}$$

$$A_2 = \frac{R_{kc}(F_b^2 R_{kc}(1 + 2R_{kc}) + 3F_b(1 + R_{kc}) - 2(1 + R_{kc}) - F_b^3 R_{kc}^2)}{(1 + F_b R_{kc})\sqrt{R_{kc}(F_b^2 R_{kc} + 4(1 + R_{kc}) - 4F_b(1 + R_{kc}))}}$$

Integrals of X(n) can be used to express number and weight average chain lengths as well as polydispersity.

$$DP_n = \int_0^\infty nX(n)DP_w = \int_0^\infty n^2 X(n)dn \bigg/ \int_0^\infty nX(n)dn \text{ where: } \int_0^\infty X(n)dn = 1$$

As expected, integration of the distribution equation X(n) gives results in exact agreement with the instantaneous moment model presented earlier for average degrees of polymerization and average molecular weights. The X(n) distribution model provides no additional or conflicting predictions of MWD averages and polydispersity. However, this complete chain length distribution model can be used to gain an understanding of how nuances in the MWD are affected by dienes addition. In particular, the model is able to predict the modality, steepness, and tailing of the MWD as function of dienes incorporation level and mode of incorporation.

Limiting Cases of the MWD Model

There are two limiting cases of the chain length distribution model. The trivial case occurs when $F_b=1$ and the polymer is completely linear having a most probable MWD. The average chain length of the resulting most probable MWD decreases with the dienes bridging level, which is completely bi-functional since $F_b=1$.

The more interesting limiting case is when there are no bi-functional linkages ($F_b=0$) and the branching metrics $R_{kc}$ and $R_n$ are identical. Since each dienes linkage is a tri-functional branch point a nomenclature can be used that is specific to branched polymers.

for $F_b=0$ $B_n$=branch points per polymer molecule=$R_{kc}=R_n$
for $F_b=0$ $B_c$=branch points per linear chain segment=$(1+B_n)/B_n$ This pure tri-functionally branched chain length distribution is shown below vs $B_n$ and $B_c$.

For $F_b = 0$, $$X(n) = e^{-n(1+B_n)/DP_{no}}\left(\frac{1+B_n}{DP_{no}}\text{Cosh}\left[\frac{n\sqrt{B_n(1+B_n)}}{DP_{no}}\right] - \frac{\sqrt{B_n(1+B_n)}}{DP_{no}}\text{Sinh}\left[\frac{n\sqrt{B_n(1+B_n)}}{DP_{no}}\right]\right)$$

for $F_b = 0$, $X(n) =$ $$e^{-n/(DP_{no}(1-B_c))}\left(\frac{\text{Cosh}\left[\frac{n\sqrt{B_c}}{DP_{no}(1-B_c)}\right] - \sqrt{B_c}\text{Sinh}\left[\frac{n\sqrt{B_c}}{DP_{no}(1-B_c)}\right]}{DP_{no}(1-B_c)}\right)$$

The above distribution functions can be integrated to give MWD averages for $F_b=0$, which are shown below. The number average molecular weight of this tri-functionally branched system does not change with increased dienes incorporation since the branching reaction does not alter the number of polymer molecules in the system.

$$\frac{DP_n}{DP_{no}} = \frac{M_n}{M_{no}} = 1$$

$$\frac{DP_w}{DP_{wo}} = \frac{M_w}{M_{wo}} = \frac{(1+2B_n)}{(1+B_n)} = (1+B_c)$$

$$Z_p = \frac{DP_w}{DP_n} = \frac{M_w}{M_n} = \frac{2(1+2B_n)}{(1+B_n)} = 2(1+B_c)$$

The above relationship of polydispersity ($M_w/M_n$) to tri-functional branching level shows no instability or divergence at any branching level. Most surprising is that at high branching levels the polydispersity is predicted to level off at 4. Of course, this prediction is for an ideal co-polymerization and symmetric catalyst system with any non-idealities expected to give an increased polydispersity.

Figure 3:
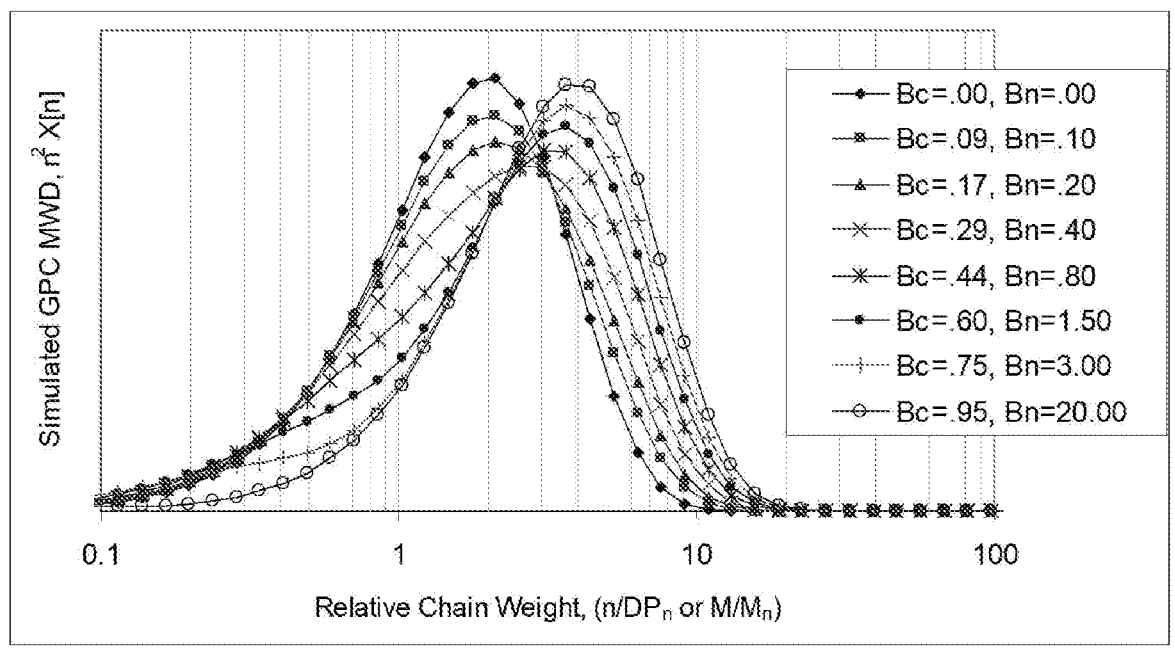
FIG. 3 is a graphical depiction of a predicted dependence of the molecular weight distribution (MWD) curve on tri-functional dienes branching level.
Figure 4:
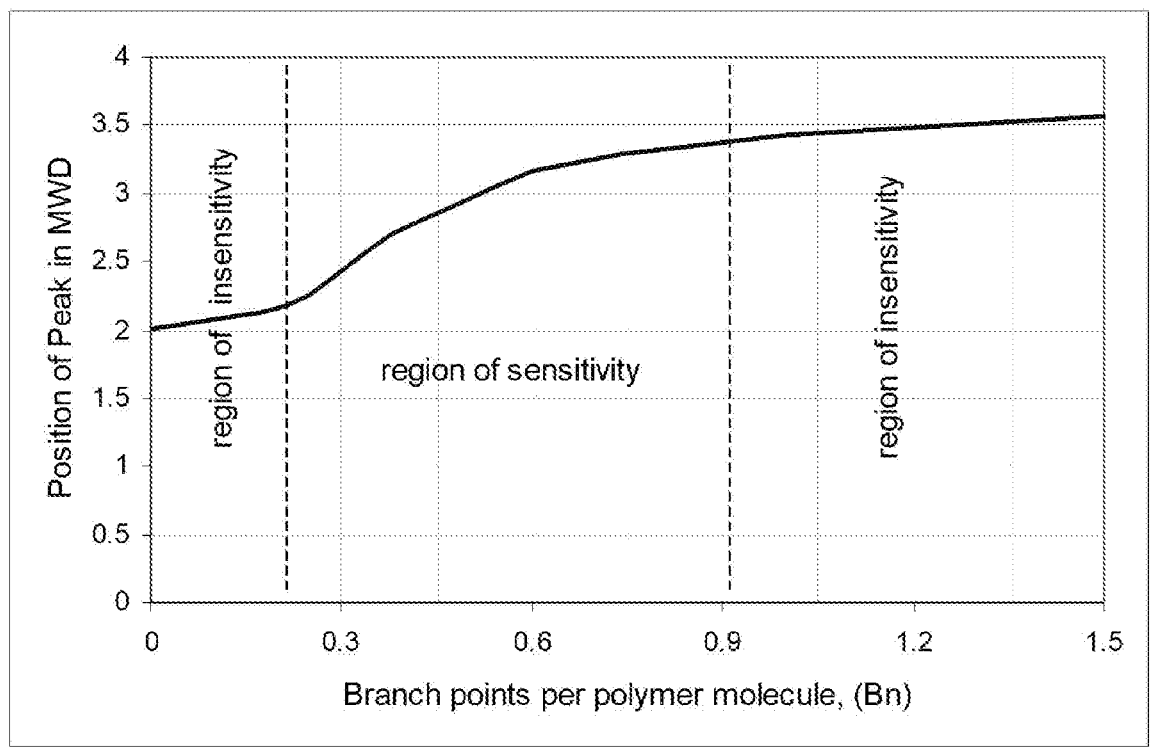
FIG. 4 is a graphical depiction of a predicted dependence of relative peak of the molecular weight (MW) on tri-functional dienes branching level.

The chain length distribution function can again be used to construct predicted MWD curves. FIG. 3 is a series of simulated SEC curves wherein the level of tri-functional branching ($B_c$ or $B_n$) is varied. The independent variable in FIG. 3 is scaled by linear molecular weight or chain length such that the plotting is universal and independent of starting molecular weight. The zero-branching case in FIG. 3 is the well-known "most probable" MWD and is expected for linear addition co-polymerization performed under ideal homogeneous conditions. FIG. 4 is a plot of relative peak MW for tri-functional dienes branching which demonstrates that the MWD peak is most sensitive to branching level at intermediate branching levels in the approximate range of $0.2 < B_n < 0.9$ or $0.17 < B_c < 0.5$.

Conventional Branching Models

The purpose of this section is to compare a variety of conventional dienes branching and random polymer coupling to the "Ladder Branching" models. The comparison demonstrates the inherent instability of conventional dienes branching and random polymer coupling in contrast to "Ladder Branching". The molecular architecture resulting from the dienes "Ladder Branching" is different from (a) the conventional Dienes Continuous Stirred Tank Reactor (CSTR) Branching Model, (b) conventional Dienes Semi-Batch Branching Model; (c) Polymer CSTR Coupling Model; and (d) Polymer Batch Coupling Model.

a) Conventional Dienes CSTR Branching Model Ver Strate-1980 (G. Ver Strate, C. Cozewith, W. W. Graessley, *J. App. Polym. Sci.* 1980, 25, 59), Guzman-2010 (J. D. Guzman, D. J. Arriola, T. Karjala, J. Gaubert, B. W. S. Kolthammer, *AIChE* 2010, 56, 1325):

$$Z_p = \frac{DP_w}{DP_n} = \frac{M_w}{M_n} = (1 - B_C)\left(\frac{1 - 4B_c - \sqrt{1 - 8B_c}}{(2B_c)^2}\right) = \frac{1 - 3B_n - \sqrt{(1 - 7B_n)(1 + B_n)}}{(2B_n)^2} \quad (44)$$

b) Conventional Dienes Semi-Batch Branching Model, Cozewith-1979 (C. Cozewith, W. W. Graessley, G. Ver Strate, *Chem. Eng. Sci.* 1979, 34, 245), and d) Polymer Batch Coupling Model, Cozewith-1979, Flory-1953 (P. J. Flory, *Principles of Polymer Chemistry*, Cornell University Press, 1953), Tobita-1995 (H. Tobita, *J. Polym. Sci. B* 1995, 33, 1191):

$$Z_p = \frac{DP_w}{DP_n} = \frac{M_w}{M_n} = \frac{2 - 2B_c}{1 - 4B_c} = \frac{2}{1 - 3B_n} \quad (45)$$

$$X(n) = e^{-n(1+2B_c)/DP_{no}}\left(\frac{1}{DP_{no}}\right)\sum_{b=0}^{\infty}\left(\frac{n}{DP_{no}}\right)^{3b}\frac{(2B_c)^b}{(1+b)!(1+2b)!} \quad (46)$$

c) Polymer CSTR Coupling Model:

$$Z_p = \frac{DP_w}{DP_n} = \quad (47)$$

$$\frac{M_w}{M_n} = (1 - B_c)\left(\frac{1 - \sqrt{1 - 16B_c}}{4B_c}\right) = \frac{1 - \sqrt{(1 - 15B_n)/(1 + B_n)}}{4B_n}$$

Characterizing Tri-Functional Long-Chain Branched Polyolefin

Depending on the degree of branching, a variety of methods can either determine LCB, such as nuclear magnetic resonance (NMR), or distinguish the effect of LCB in the polymer. For example, the effect of LCB is observed in shear flow in the van Gurp-Palmen analysis, also an increase of the shear viscosity at low angular frequencies and strength of the shear thinning behavior can be attributed to LCB. In extensional flow, the influence of LCB is usually identified in the degree of strain hardening or the strength of the melt and the maximum deformation achieved. Other plots such as Mark-Houwink plots, broadening molecular weight distributions (MWD), and $g'_{vis}$ plots provide additional information about LCB. A high level of natural LCB in a polymer is difficult to achieve due to the limited concentration of vinyl terminated polymers (maximum one per polymer chain) and the need to run to high conversion to ensure LCB formation. To ensure high conversion, there is a low ethylene concentration in the reactor, thus enabling a great amount of vinyl terminated polymers to be reinserted in a second polymer chain.

Figure 7:
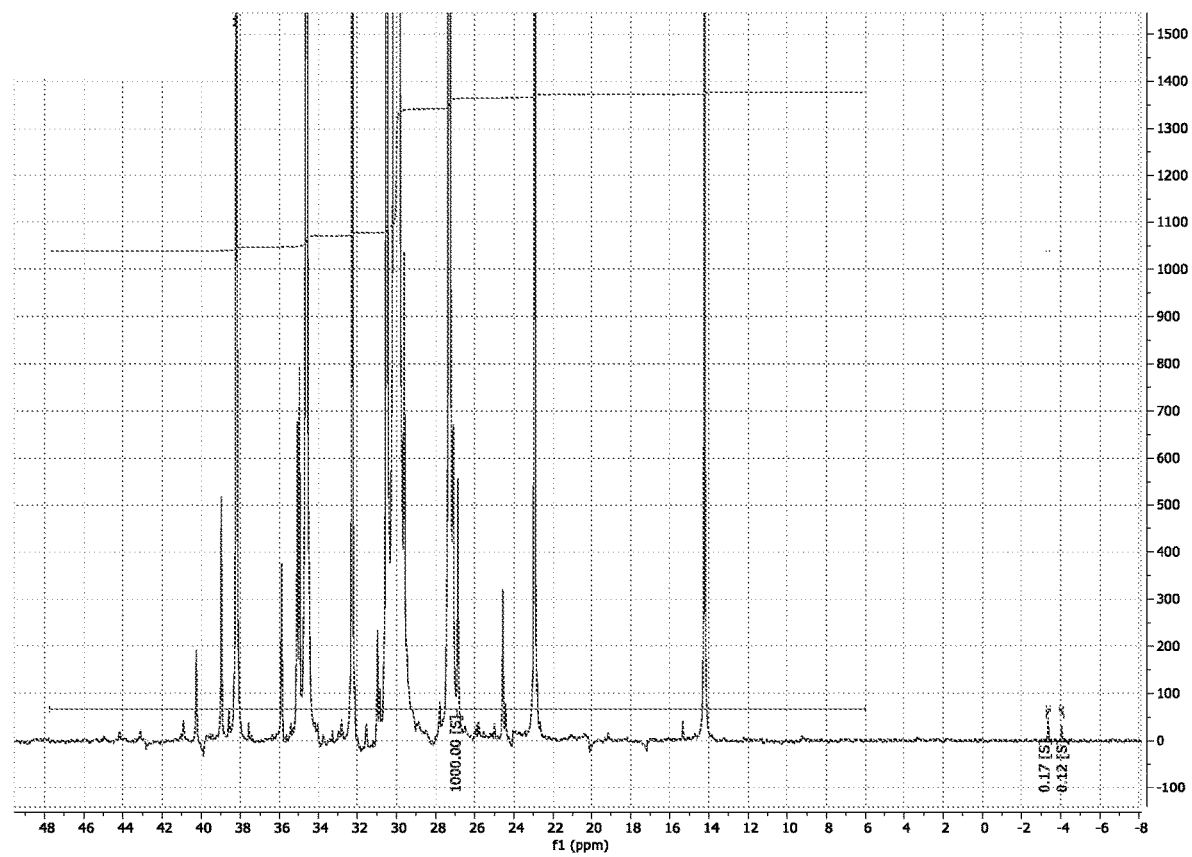
FIG. 7 is an overall carbon NMR spectrum of dimethyldivinylsilane branched polyethylene (example 12.1).
Figure 8:
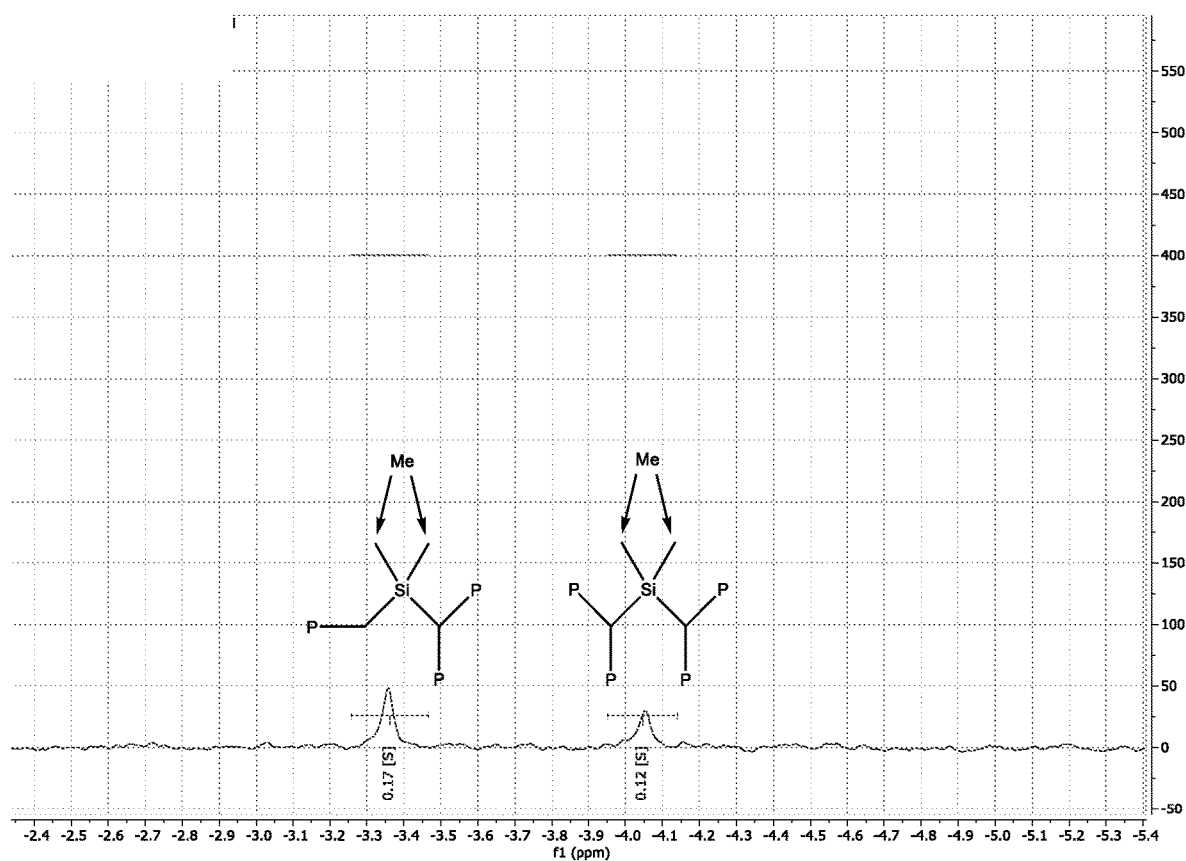
FIG. 8 is the $Si(Me)_2$ region of the carbon NMR spectrum of dimethyldivinylsilane branched polyethylene (Example 12.1). Tri-functional LCB carbons=0.17 Me/1000 C and tetra-functional LCB carbons=0.12 Me/1000 C.
Figure 9:
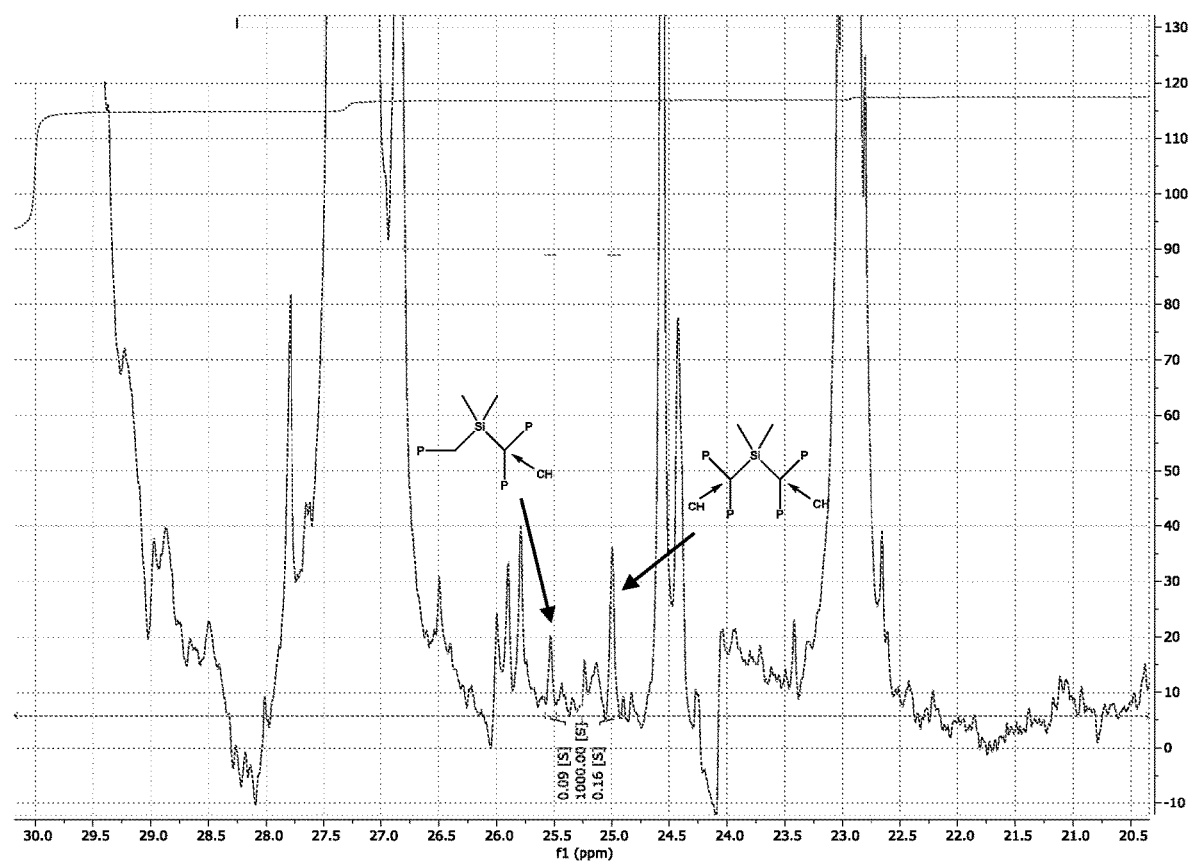
FIG. 9. Methine region of the carbon NMR spectrum of dimethyldivinylsilane branched polyethylene (Example 12.1). Tri-functional LCB=0.09 CH/1000 C, tetra-functional LCB=0.16 CH/1000 C.

To distinguish differences between tri-functional and tetra-functional long-chain branching, NMR analyses are best. Some dienes allow for diagnostic measures of tri-functional and tetra-functional long-chain branching. The mechanism in Scheme 6 depicts the difference in formation of tri-functional and tetra-functional long-chain branching. In this case, the ratio of branching can be controlled by the ratio of ethylene to hydrogen in the reactor. In this specific example, dimethyldivinylsilane has diagnostic methyl groups on the silicon atom, which can be used for determining tri-functional or tetra-functional long-chain branching (see Scheme 6 and FIG. 7-FIG. 9). Carbons on the silicon of the tetra-functional branched polymer are shifted upheld relative to the carbons on the silicon of the tri-functional branched polymer (see FIG. 8). Examples will show that control of the tri-functional to tetra-functional long-chain branch ratio is possible.

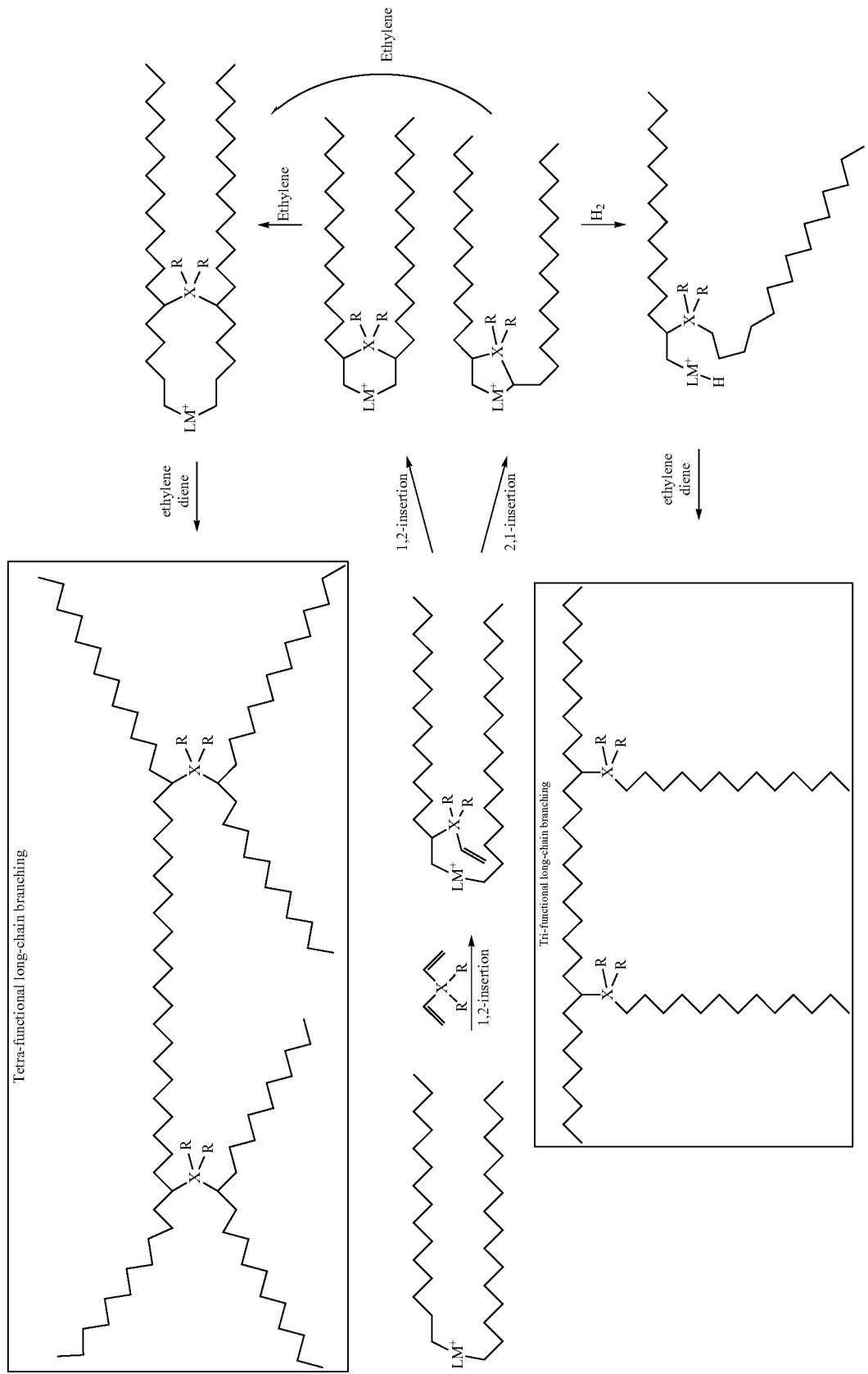
Scheme 6: Depiction of tri-functional long-chain branch formation from reaction of a diene.

In addition to hydrogenolysis, termination events such as β-hydride elimination could also lead to tri-functional long-chain branching. If β-hydride elimination is the key mechanism, an unsaturation will be present as shown, for example, as the vinylene group in Scheme 7.

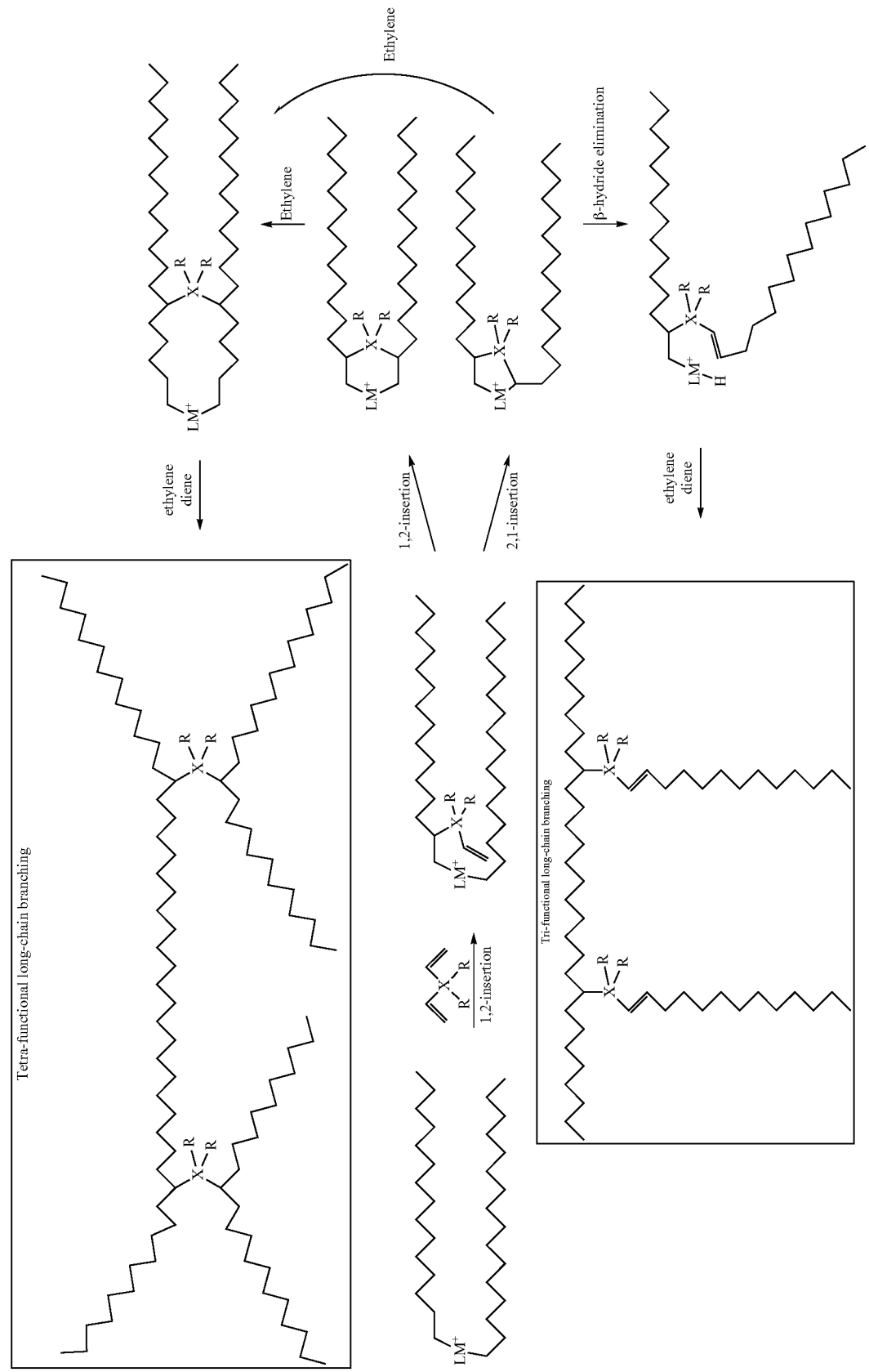
Scheme 7: Depiction of tri-functional long-chain branch formation from reaction of a diene followed by β-hydride elimination.

The conventional process of incorporating dienes into a polymer synthesis system suffers from the fundamental flaw of gel formation or reactor fouling at high branching levels. The kinetic modeling, discussed in previous paragraphs, may provide good predictive results that enable a better understanding of gel formation. For example, longer polymer chains have proportionally more pendant vinyls and polymer chains containing more pendant vinyls will more likely re-insert into the catalyst to form a LCB. Thus, the larger polymer chains preferentially re-insert forming tetra-functional branches, which are even larger polymer molecules, and a gel problem or instability results when the LCB level reaches a threshold value. A simulation of the weight average molecular weight ($M_w$) and number average molecular weight ($M_n$) as a function of conventional tetra-functional branching is shown in FIG. 1 for ethylene-based polymer in a semi-batch reactor at constant pressure. In FIG. 1, $M_n$ only marginally increases as $M_w$ becomes infinite. In this example, as the $M_w$ increases to a number greater than 200,000 grams per mole (g/mol), the polymer molecular weight distribution (MWD) becomes unstable and gels begin to form. The MWD is defined by the weight average molecular weight, $M_w$, divided by the number average molecular weight, $M_n$, ($M_w/M_n$).

Polymer gels are narrowly defined for the purpose of this disclosure to be a polymer fraction that is phase separated due to its high branching level and/or high molecular weight. Polymer gels can be observed in solution or in the melt and tend to interfere with properties such as optical clarity and film and fiber performance. Polyethylene interpolymer gels can be measured by degree of polymer insolubility in hot xylene. Gels content is often correlated to and therefore estimated from GPC polymer recovery percentage. When polymer gels form, they may deposit within the reactor and result in fouling.

Figure 5:
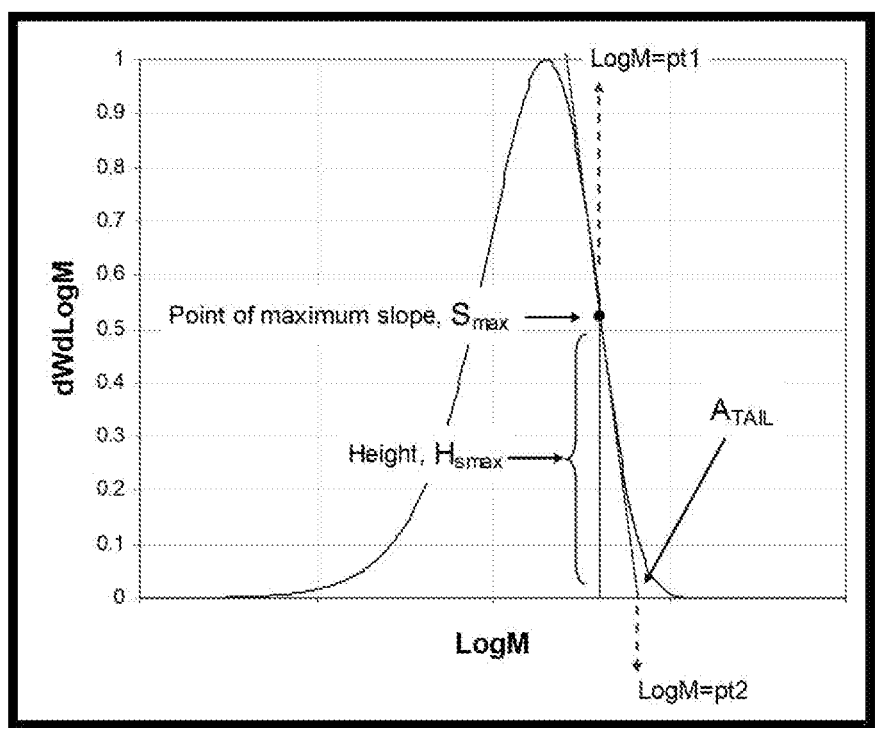
FIG. 5 is a graphical depiction of the MWD curve illustrating how the high MWD tail area metrics are defined using the point of maximum slope.

Measures have been previously disclosed (described in Application Nos. PCTUS2019/053524; PCTUS2019/053527; PCTUS2019/053529; and PCTUS2019/053537, each filed Sep. 27, 2019) to describe the high molecular weight tailing effect when dienes are added to a polymerization. Tetra-functional "Ladder Branched" polymers do not show this tailing effect. A series of metrics have been previously disclosed, namely G(79/29), G(96/08), $A_{HIGH}$, and $A_{TAIL}$, which quantify the amount of high MW polymer (see FIG. 5). The term "high MW tailing" or "high molecular weight tail" refers to the high molecular weight fraction as shown by the conventional GPC and the absolute GPC. Depending on catalyst-diene pairing and experimental conditions, one might expect a "Ladder Branched" system to have some conventional branching thereby raising the shape metric value above that expected for pure "Ladder Branching".

The values defined by $A_{HIGH}$ or $A_{TAIL}$ increase dramatically as the conventional branching level is increased. However, the "Ladder Branching" model (tetra-functional or tri-functional) predicts that the high MW area metrics ($A_{HIGH}$ or $A_{TAIL}$) are almost unaffected by "Ladder Branching" level. The values of $A_{HIGH}$ and $A_{TAIL}$ for a most probable MWD are about 0.07 and 0.015, respectively. Example MWD data will demonstrate that the dienes-free linear polymers tend to have slightly higher values of $A_{HIGH}$ and $A_{TAIL}$ due to non-ideal aspects of the polymerization. Example data also show a variety of highly branched "Ladder Branched" polymers with essentially no high MW tail beyond what is expected from a most probable MWD. The high MW area metrics also are diagnostic of slight levels of high MW tail formation that "Ladder Branched" polymer can exhibit when accompanied by a degree of conventional branching. The metric $A_{TAIL}$ is less influenced by linear MWD non-ideality than $A_{HIGH}$. However, in theory, $A_{HIGH}$ and $A_{TAIL}$ metrics are equally indicative of high MW tail formation.

Tri-Functional Long-Chain Branched Polyolefin

Polymers produced from the "Ladder Branching", as described in Scheme 4, are included in this disclosure.

In some embodiments, the polymers of this disclosure have tri-functional long-chain branching levels of greater than 0.1 per 1000 carbon atoms. In some embodiments, the polymers of this disclosure have tri-functional long-chain branching levels of greater than 0.2 per 1000 carbon atoms, greater than 0.3 per 1000 carbon atoms, greater than 0.4 per 1000 carbon atoms, or greater than 0.5 per 1000 carbon atoms.

In embodiments, the ethylene-based polymers of this disclosure include a melt viscosity ratio or rheology ratio ($V_{0.1}/V_{100}$) at 190° C. of at least 10, where $V_{0.1}$ is the viscosity of the ethylene-based polymer at 190° C. at an angular frequency of 0.1 radians/second, and $V_{100}$ is the viscosity of the ethylene-based polymer at 190° C. at an angular frequency of 100 radians/second. In one or more embodiments, the melt viscosity ratio is at least 14, at least 20, at least 25, or at least 30. In some embodiments, the melt viscosity ratio is greater than 50, at least 60, or greater than 100. In some embodiments, the melt viscosity ratio is from 14 to 200.

The "rheology ratio" and "melt viscosity ratio" are defined by $V_{0.1}/V_{100}$ at 190° C., where $V_{0.1}$ is the viscosity of the ethylene-based polymer at 190° C. at an angular frequency of 0.1 radians/second, and $V_{100}$ is the viscosity of the ethylene-based polymer at 190° C. at an angular frequency of 100 radians/second.

In one or more embodiments, the ethylene-based polymers of this disclosure have an average g' less than 0.86, where the average g' is an intrinsic viscosity ratio determined by gel permeation chromatography using a triple detector. In some embodiments, the ethylene-based polymers of this disclosure have an average g' from 0.55 to 0.86. All individual values and subranges encompassed by "from 0.55 to 0.86" are disclosed herein as separate embodiments; for example, the average g' of the ethylene-based polymer may range from 0.64 to 0.75, from 0.58 to 0.79, or from 0.65 to 0.83. In one or more embodiments, the average g' is from 0.55 to 0.84, from 0.59 to 0.82, or from 0.66 to 0.80.

In one or more embodiments, the melt viscosity ratio of the ethylene-based polymer of this disclosure may be greater than ten times the elasticity factor where the melt viscosity ratio ($V_{0.1}/V_{100}$) is determined by $V_{0.1}$, the viscosity of the ethylene-based polymer at 190° C. at an angular frequency of 0.1 radians/second, and $V_{100}$, the viscosity of the ethylene-based polymer at 190° C. at an angular frequency of 100 radians/second, and the elasticity factor m is $[((\tan(\delta_{0.1})-\tan(\delta_{100}))*1000)/(0.1-100)]$, wherein $\tan(\delta_{0.1})$ is the tangent of the phase angle at 0.1 radians/second, and $\tan(\delta_{100})$ is the tangent of the phase angle at 100 radians/second.

In one or more embodiments, the ethylene-based polymer may have an elasticity factor m at 190° C. that is less than or equal to 8 seconds/radian, where m is $[((\tan(\delta_{0.1})-\tan(\delta_{100}))*1000)/(0.1-100))]$. In other embodiments, the ethylene-based polymer may have an elasticity factor m at 190° C. that is less than or equal to 4 seconds/radian.

In various embodiments, the melt strength of the ethylene-based polymer of this disclosure may be greater than 6 cN (Rheotens device, 190° C., 2.4 mm/s$^2$, 120 mm from the die exit to the center of the wheels, extrusion rate of 38.2 s$^{-1}$, capillary die of 30 mm length, 2 mm diameter and 180° entrance angle). In some embodiments, the melt strength of the ethylene-based polymer may be greater than 10 cN.

In embodiments, the ethylene-based polymer may have a molecular weight tail quantified by an MWD area metric $A_{TAIL}$, and $A_{TAIL}$ is less than or equal to 0.04. All individual values and subranges encompassed by "less than or equal to 0.04" are disclosed herein as separate embodiments. For example, in some embodiments, the $A_{TAIL}$ of the ethylene-based polymer of this disclosure is greater than 0 and less than or equal to 0.03 as determined by gel permeation chromatography using a triple detector.

In one or more embodiments, the polymer of this disclosure may have a weight average molecular weight ($M_w$) of less than or equal to 800,000 Daltons, as determined by gel permeation chromatography using a triple detector. In various embodiments, the polymer may have a weight average molecular weight ($M_w$) of less than or equal to 400,000 Daltons, less than or equal to 200,000 Daltons, or less than or equal to 150,000 Daltons, as determined by gel permeation chromatography using a triple detector.

In or more embodiments, the polymer of this disclosure may have an $M_w/M_n$ (weight average molecular weight/number average molecular weight) of less than or equal to 6, as determined by gel permeation chromatography using a triple detector. In various embodiments, the polymer may have a have an $M_w/M_n$ of less than 5, or less than 4 as determined by gel permeation chromatography using a triple detector. In some embodiments, the MWD of the long chain branches polymer is from 1 to 3; and other embodiments include MWD from 1.5 to 2.5.

Each $M_{w0}$ and the $M_{p0}$ is a metric of polymer resins without the addition of diene into the reactor during polymerization, as previously discussed. Each subsequent addition of diene produces a polymer resin from which the metric $M_w$ or $M_p$ may be determined. The amount of diene incorporated into the reactor is small in comparison to the other reactants in the reactor. Therefore, the addition of diene does not affect the total amount of comonomer, ethylene, and solvent in the reactor.

In various embodiments, the ethylene-based polymer has a gpcBR branching index of from 0.1 to 3.0. All individual values and subranges encompassed by "from 0.10 to 3.00" are disclosed herein as separate embodiments; for example, the ethylene-based polymers, may include a gpcBR branching index of from 0.10 to 2.00, from 0.10 to 1.00, from 0.15 to 0.65, from 0.20 to 0.75, or 0.10 to 0.95.

The long-chain branching polymerization processes described in the preceding paragraphs are utilized in the polymerization of olefins, primarily ethylene and propylene. In some embodiments, there is only a single type of olefin or α-olefin in the polymerization scheme, creating what is essentially a homopolymer with small amounts of incorporated diene comonomer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, 4-methyl-1-pentene, and ethylidene norbornene. For example, the one or more α-olefin co-monomers may be selected from the group consisting of propylene, 1-butene, 1-hexene, and 1-octene; or in the alternative, from the group consisting of 1-hexene and 1-octene.

The long-chain branched polymer, for example homopolymers and/or interpolymers (including copolymers) of ethylene and optionally one or more co-monomers such as α-olefins, may comprise at least 50 percent by weight of units derived from ethylene. All individual values and subranges encompassed by "from at least 50 weight percent" are disclosed herein as separate embodiments; for example, the ethylene-based polymers, homopolymers and/or interpolymers (including copolymers) of ethylene and optionally one or more co-monomers such as α-olefins may comprise at least 60 percent by weight of units derived from ethylene; at least 70 percent by weight of units derived from ethylene; at least 80 percent by weight of units derived from ethylene; or from 50 to 100 percent by weight of units derived from ethylene; or from 80 to 100 percent by weight of units derived from ethylene.

In some embodiments of the ethylene-based polymers, the ethylene-based polymer includes additional α-olefin. The amount of additional α-olefin in the ethylene-based polymer is less than or equal to 50 mole percent (mol %); other embodiments the amount of additional α-olefin includes at least 0.01 mol % to 25 mol %; and in further embodiments the amount of additional α-olefin includes at least 0.1 mol % to 10 mol %. In some embodiments, the additional α-olefin is 1-octene.

In some embodiments, the long-chain branched polymers may comprise at least 50 percent by moles of units derived from ethylene. All individual values and subranges from at least 90 mole percent are included herein and disclosed herein as separate embodiments. For example, the ethylene based polymers may comprise at least 93 percent by moles of units derived from ethylene; at least 96 percent by moles of units; at least 97 percent by moles of units derived from ethylene; or in the alternative, from 90 to 100 percent by moles of units derived from ethylene; from 90 to 99.5 percent by moles of units derived from ethylene; or from 97 to 99.5 percent by moles of units derived from ethylene.

In some embodiments of the long-chain branched polymer, the amount of additional α-olefin is less than 50%; other embodiments include at least 1 mole percent (mol %) to 20 mol %; and in further embodiments the amount of additional α-olefin includes at least 5 mol % to 10 mol %. In some embodiments, the additional α-olefin is 1-octene.

Any conventional polymerization processes may be employed to produce the long-chain branched polymer. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a single loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the long-chain branched polymer may be produced via solution polymerization in a single reactor system, for example a single loop reactor system, in which ethylene and optionally one or more α-olefins are polymerized in the presence of the catalyst system, as described within this disclosure, and optionally one or more co-catalysts, as described in the preceding paragraphs. In some embodiments, the long-chain branching polymerization process for producing the long-chain branched polymer includes polymerizing ethylene and at least one additional α-olefin in the presence of a catalyst system.

The long-chain branched polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene based polymers and the one or more additives. The ethylene-based polymers may further comprise fillers, which may include, but are not limited to, organic or inorganic fillers. The long-chain branched polymers may contain from about 0 to about 20 weight percent fillers such as, for example, calcium carbonate, talc, or Mg(OH)$_2$, based on the combined weight of the ethylene based polymers and all additives or fillers. The ethylene-based polymers may further be blended with one or more polymers to form a blend.

In some embodiments, the long-chain polymerization process for producing long-chain branched polymers may include polymerizing ethylene and at least one additional α-olefin in the presence of a catalyst having two polymer producing sites. The long-chain branched polymer resulting from such the catalyst having two polymer producing sites may have a density according to ASTM D792 (incorporated herein by reference in its entirety) from 0.850 g/cm$^3$ to 0.960 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the long-chain branched polymer resulting from the long-chain polymerization process may have a melt flow ratio ($I_{10}/I_2$) from 5 to 100, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 50, in others, the melt flow ratio is from 5 to 25, in others, the melt flow ratio is from 5 to 9.

Gel Permeation Chromatography (GPC) (Conventional GPC)

The chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all absolute Light scattering measurements, the 15 degree angle is used for measurement. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000, 000. The polystyrene standards were dissolved at 80 degrees Celsius with gentle agitation for 30 minutes. The polystyrene standard peak molecular weights were converted to polyethylene molecular weights using Equation 48 (as described in Williams and Ward, J. Polym. Sci., Polym. Let., 6, 621 (1968)).

$$M_{polyethylene}=A \times (M_{polystyrene})^B \quad (48)$$

where M is the molecular weight, A has a value of 0.4315 and B is equal to 1.0.

A polynomial between 3$^{rd}$ and 5$^{th}$ order was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation). The plate count (Equation 49) and symmetry (Equation 50) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2 \quad (49)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (50)$$

where RV is the retention volume in milliliters and the peak width is in milliliters, Peak max is the maximum position of the peak, one tenth height is ⅒ height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 51-53, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum_i IR_i}{\sum_i (IR_i / M_{polyethylene_i})} \quad (51)$$

$$Mw_{(GPC)} = \frac{\sum_i (IR_i * M_{polyethylene_i})}{\sum_i IR_i} \quad (52)$$

$$Mz_{(GPC)} = \frac{\sum_i (IR_i * M_{polyethylene_i}^2)}{\sum_i (IR_i * M_{polyethylene_i})} \quad (53)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate$_{(nominal)}$) for each sample by RV alignment of the respective decane peak within the sample (RV$_{(FM\ Sample)}$) to that of the decane peak within the narrow standards calibration (RV$_{(FM\ Calibrated)}$). Any changes in the time of the decane marker peak are then assumed to be related to a linear-shift in flowrate (Flowrate$_{(effective)}$) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−2% of the nominal flowrate.

Flowrate$_{(effective)}$=Flowrate$_{(nominal)}$*(RV$_{(FM\ Calibrated)}$/RV$_{(FM\ Sample)}$) (54)

Triple Detector GPC (TDGPC) (Absolute GPC)

The chromatographic system, run conditions, column set, column calibration and calculation conventional molecular weight moments and the distribution were performed according to the method described in Gel Permeation Chromatography (GPC).

For the determination of the viscometer and light scattering detector offsets from the IR5 detector, the Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard ($M_w/M_n$>3) to the narrow standard column calibration results from the narrow standards calibration curve using PolymerChar GPCOne™ Software.

The absolute molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, is obtained from the mass detector area and the mass detector constant, derived from a suitable linear polyethylene homopolymer, or one of the polyethylene standards of known weight average molecular weight. The calculated molecular weights (using GPCOne™) are obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) may be determined from a linear standard with a molecular weight in excess of about 50,000 g/mole. The viscometer calibration (determined using GPCOne™) may be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($M_{w(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are linearly extrapolated at chromatographic ends where signal to noise becomes low (using GPCOne™) Other respective moments, $M_{n(Abs)}$ and $M_{z(Abs)}$ are be calculated according to equations 55-56 as follows:

$$Mn_{(Abs)} = \frac{\sum_i IR_i}{\sum_i (IR_i / M_{Absolute_i})} \quad (55)$$

$$Mz_{(Abs)} = \frac{\sum_i (IR_i * M_{Absolute_i}^2)}{\sum_i (IR_i * M_{Absolute_i})} \quad (56)$$

Dynamic Mechanical Spectrum (or Small Angle Oscillatory Shear)

The complex viscosity (η*), moduli (G', G"), tan delta, and phase angle (δ) are obtained by dynamic oscillatory frequency sweep test in a frequency range from 0.1 to 100 rad/s, at 190° C. The level of strain is set within the linear viscoelastic regime as identify by a strain sweep test at 100 rad/s at 190° C. Tests are performed with stainless steel parallel plates of 25 mm diameter on a strain controlled rheometer ARES-G2 by TA Instruments. Samples of 3.3 mm thickness are squeezed and then trimmed in two steps prior to the actual test. In the first step, the sample are allowed to melt for 2.5 min, squeezed to 3 mm gap and trimmed. After an additional 2.5 min of soak time at 190° C., the sample are squeezed to 2 mm gap, and the excess of material trimmed. The method has an additional five minute delay built in to allow the system to reach thermal equilibrium. Tests are performed under nitrogen atmosphere.

gpcBR Branching Index by Triple Detector GPC (TDGPC)

The gpcBR branching index was determined by first calibrating the light scattering, viscosity, and concentration detectors as described previously. Baselines were then subtracted from the light scattering, viscometer, and concentration chromatograms. Integration windows were then set, to ensure integration of all of the low molecular weight retention volume range in the light scattering and viscometer chromatograms that indicate the presence of detectable polymer from the refractive index chromatogram. Linear polyethylene standards were then used to establish polyethylene and polystyrene Mark-Houwink constants. Upon obtaining the constants, the two values were used to construct two linear reference conventional calibrations for polyethylene molecular weight and polyethylene intrinsic viscosity as a function of elution volume, as shown in Equations (57) and (58):

$$M_{PE} = \left(\frac{K_{PS}}{K_{PE}}\right)^{1/\alpha_{PE}+1} \cdot M_{PS}^{\alpha_{PS}+1/\alpha_{PE}+1} \tag{57}$$

$$[\eta]_{PE} = K_{PS} \cdot M_{PS}^{\alpha+1} / M_{PE} \tag{58}$$

The gpcBR branching index is a robust method for the characterization of long chain branching as described in Yau, Wallace W., "Examples of Using 3D-GPC—TREF for Polyolefin Characterization," *Macromol. Symp.*, 2007, 257, 29-45. The index avoids the "slice-by-slice" TDGPC calculations traditionally used in the determination of g' values and branching frequency calculations, in favor of whole polymer detector areas. From TDGPC data, one can obtain the sample bulk absolute weight average molecular weight ($M_w$, abs) by the light scattering (LS) detector, using the peak area method. The method avoids the "slice-by-slice" ratio of light scattering detector signal over the concentration detector signal, as required in a traditional g' determination. With TDGPC, sample intrinsic viscosities were also obtained independently using Equation (63). The area calculation in this case offers more precision, because, as an overall sample area, it is much less sensitive to variation caused by detector noise and TDGPC settings on baseline and integration limits. More importantly, the peak area calculation was not affected by the detector volume offsets. Similarly, the high-precision, sample intrinsic viscosity (IV) was obtained by the area method in Equation (59):

$$IV = [\eta] = \sum_i w_i IV_i = \tag{59}$$

$$\sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP \text{ Area}}{Conc. \text{ Area}},$$

In equation (59), $DP_i$ stands for the differential pressure signal monitored directly from the online viscometer. To determine the gpcBR branching index, the light scattering elution area for the sample polymer was used to determine the molecular weight of the sample. The viscosity detector elution area for the sample polymer was used to determine the intrinsic viscosity (IV or [η]) of the sample. Initially, the molecular weight and intrinsic viscosity for a linear polyethylene standard sample, such as SRM1475a or an equivalent, were determined using the conventional calibrations ("cc") for both molecular weight and intrinsic viscosity as a function of elution volume:

$$[\eta]_{CC} = \sum_i \left(\frac{C_i}{\sum_i C_i}\right) IV_i = \sum_i w_i IV_{cc,i}. \tag{60}$$

Equation (61) was used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \tag{61}$$

wherein [η] is the measured intrinsic viscosity, $[\eta]_{cc}$ is the intrinsic viscosity from the conventional calibration (or conv GPC), Mw is the measured weight average molecular weight, and $M_{w,cc}$ is the weight average molecular weight of the conventional calibration. The weight average molecular weight by light scattering (LS) is commonly referred to as "absolute weight average molecular weight" or "$M_w$(abs)." The $M_{w,cc}$ from using conventional GPC molecular weight calibration curve ("conventional calibration") is often referred to as "polymer chain backbone molecular weight," "conventional weight average molecular weight" and "$M_w$ (conv)."

All statistical values with the "cc or cony" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for a and Log K for the determination of gpcBR in this particular case are 0.725 and −3.355, respectively, for polyethylene, and 0.722 and −3.993, respectively, for polystyrene. Once the K and a values have been determined using the procedure discussed.

Previously, the procedure was repeated using the branched samples. The branched samples were analyzed using the final Mark-Houwink constants as the best "cc" calibration values.

The interpretation of gpcBR is straight forward. For linear polymers, gpcBR will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due to the molecular size contraction effect as a result of polymer branching. A gpcBR value of 0.5 or 2.0 would mean a molecular size contraction effect of IV at the level of 50% and 200%, respectively, versus a linear polymer molecule of equivalent weight. For these particular examples, the advantage of using gpcBR, in comparison to a traditional "g'" index" and branching frequency calculations, is due to the higher precision of gpcBR. All of the parameters used in the gpcBR index determination are obtained with good precision, and are not detrimentally affected by the low TDGPC detector response at high molecular weight from the concentration detector. Errors in detector volume alignment also do not affect the precision of the gpcBR index determination.

NMR Analysis

Sample preparation. The raw polymer samples contained solvent and catalyst residues which must be removed prior to NMR measurements of unsaturation and branching. The polymers were first dissolved in tetrachloroethane (TCE) at 120-125° C., then precipitated using 3-Propanol (IPA) and cooled to room temperature. The polymer was isolated by centrifugation. This process of washing the polymer was repeated at least 3 times. The resulting polymer was then dried in a vacuum oven at 50° C.

Approximately 70 mg of the washed and dried polymer was placed in a 10 mm NMR tube with 2.8 ml of TCE. The sample was purged by bubbling house nitrogen through the sample for 15 minutes. The purged sample was then placed in an aluminum heating block at 125° C.

For branching analysis, single pulse $^{13}$C NMR spectra of the samples were taken at 120° C. using a 600 MHz Bruker Avance III HD spectrometer equipped with a 10 mm 13C/1H DUL CryoProbe to collect between 1400 and 5000 scans, with a 90 pulse and a total relaxation delay (AQ+D1) of 10 seconds.

For quantitation of tetra-functional and tri-functional long-chain branches in polymers made using dimethyldivinylsilane as the diene, single pulse $^{13}$C NMR spectra of the samples were taken at 120° C. using a 600 MHz Bruker Avance III HD spectrometer equipped with a 10 mm 13C/1H DUL CryoProbe to collect 960 to 5000 scans with a 90 pulse and a total relaxation delay (AQ+D1) of 12 seconds. Alternately QA-RINEPT spectra (J. Hou, Y. He, X. Qiu, Macromolecules, 2017, 50, 2407-2414) were taken using a 7 sec. relaxation delay. The parameters QA-RINEPT were chosen to match the methyl to total carbon ratio for QA-RINEPT and the single pulse data.

Data Processing and method of assignments. All NMR data was processed using Mnova with 0.5 HZ line-broadening for proton spectra and 3 Hz line-broadening for carbon spectra. Proton data was referenced to the TCE solvent resonance at 5.99 ppm. Carbon spectra were referenced to the main $CH_2$ of the polymer at 29.99 ppm The hypothetical assignments for the tri-functional LCB (~3.36 ppm) and tetra-functional LCB silyl-methyls (~4.06 ppm) were obtained using ACD CNMR predictor and were found to be in close agreement to the resonances observed. These assignments were confirmed using the quantitative relationship between the branch methine resonances (tetra-functional at 24.9 ppm, tri-functional at 25.7 ppm) and the resonance for the $CH_2$ carbon alpha to the Y-branch silicon (~15.3 ppm).

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter (Micro Motion). For some experiments, the standard conditions at 150° C. are 13 g ethylene, 15 g 1-octene, 240 psi hydrogen in 585 g of IsoparE, and the standard conditions at 150° C. are 15 g ethylene, 45 g 1-octene, 200 psi hydrogen in 555 g of IsoparE.

The procatalyst and activators are mixed with the appropriate amount of purified toluene to achieve a desired molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

Examples from Batch Reactor

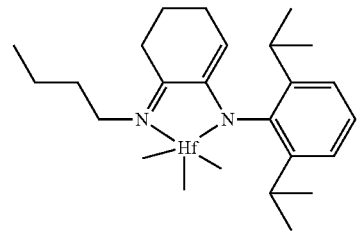

Batch Reactor Example 1

Catalyst 1

-continued

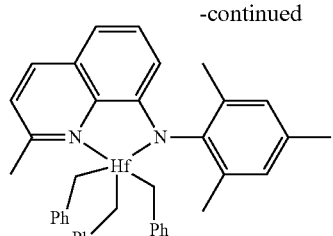

Catalyst 2

In Table 2, the polymer characteristics of a comparative linear polymer sample (1.C) was compared to branched polymers from a batch reactor. Polymerization reactions occurred at a temperature of 150° C., in 585 g of ISOPAR-E™, 15 g of octene, and a hydrogen pressure ($\Delta H_2$) of 240 psi. 14 g of ethylene was loaded and pressure maintained in the presences of 0.3 μmole of Catalyst 1, 0.36 μmole of Co-Catalyst A (methyldi(tetradecyl)ammonium tetrakis (pentafluorophenyl)borate), and 10 μmole MMAO-3A. Diene dimethyldivinylsilane was added as indicated in the table.

TABLE 2

Polymer runs and characteristics of the batch reactor polymer of Example 1 and the comparative.

| | | | | | Conventional GPC | | | | NMR per 1000C | |
| | | | | | | Data and Metrics | | | Tetra- | Tri- |
| Ex. | Diene Added (g) | Yield (g) | Octene (mol %) | $T_m$ (° C.) | Mn | Mw (g/mole) | Mp | $A_{TAIL}$ | functional LCB | functional LCB |
| --- | --- | --- | --- | --- | --- | --- | --- | --- | --- | --- |
| 1.C | 0.0 | 8.5 | 3.4 | 109.8 | 21,059 | 64,711 | 51,286 | 0.027 | 0.00 | 0.00 |
| 1.1 | 0.3 | 11.0 | 3.1 | 113.0 | 23,724 | 93,653 | 69,183 | 0.020 | 0.04 | 0.07 |
| 1.2 | 0.6 | 9.0 | 3.0 | 114.0 | 23,209 | 94,890 | 79,433 | 0.023 | | |
| 1.3 | 0.9 | 7.5 | 2.8 | 114.2 | 23,579 | 96,494 | 83,176 | 0.026 | 0.16 | 0.19 |
| 1.4 | 1.2 | 8.2 | 2.9 | 113.6 | 23,038 | 96,747 | 81,283 | 0.028 | | |
| 1.5 | 1.5 | 6.0 | 2.8 | 115.1 | 19,070 | 85,689 | 69,183 | 0.032 | 0.17 | 0.25 |
| 1.6 | 1.8 | 5.8 | 3.0 | 112.7 | 18,676 | 79,611 | 63,096 | 0.035 | | |
| 1.7 | 3.0 | 4.8 | 2.9 | 115.2 | 17,214 | 75,800 | 58,884 | 0.036 | 0.31 | 0.49 |

| | Absolute GPC Data and Metrics | | | | | | | | | |
| Ex. | Mn | Mw (g/mole) | Mp | $A_{TAIL}$ | gpcBR | $g'_{avg}$ | $V_{0.1}$ Pa s | $V_{100}$ Pa s | $V_{0.1}/V_{100}$ | MS cN | Ext mm/s |
| --- | --- | --- | --- | --- | --- | --- | --- | --- | --- | --- | --- |
| 1.C | 25,552 | 67,491 | 60,258 | 0.020 | 0.18 | 0.86 | 1,041 | 672 | 1.5 | | |
| 1.1 | | | | | | | | | | | |
| 1.2 | | | | | | | | | | | |
| 1.3 | | | | | | | | | | | |
| 1.4 | | | | | | | | | | | |
| 1.5 | | | | | | | | | | | |
| 1.6 | | | | | | | | | | | |
| 1.7 | | | | | | | | | | | |

Table 2 collects data for the comparative example, 1.0 and other diene examples, 1.1-1.7. NMR data demonstrate both tri-functional and tetra-functional LCB and increasing levels of LCB with increasing diene.

Figure 6:
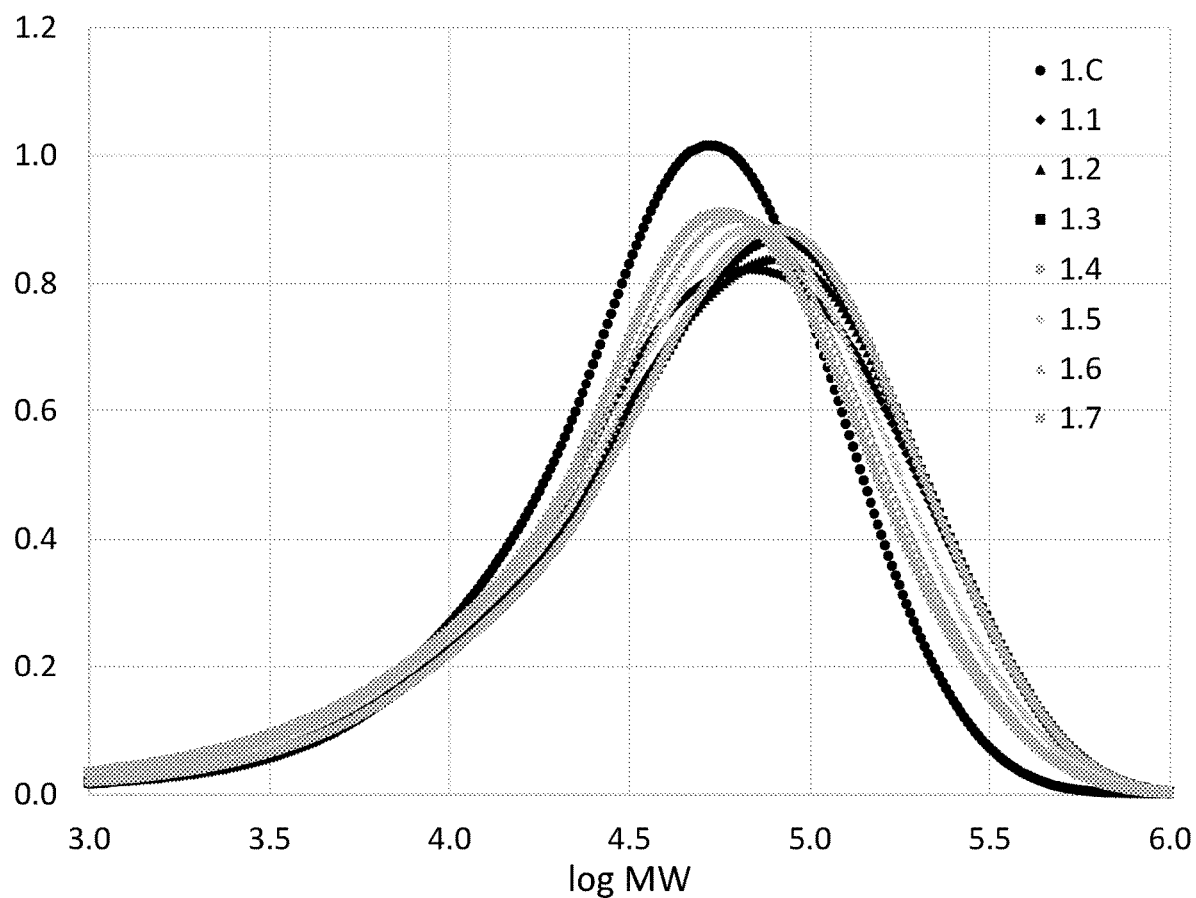
FIG. 6. Conventional (RI) GPC of dimethyldivinylsilane samples with increasing amount of diene (Examples 1.0 and 1.1-1.7).

FIG. 6 depicts the conventional molecular weight distributions for the examples with different amounts of diene.

Batch Reactor Example 2

In Table 3, the polymer characteristics of a comparative linear polymer sample (2.C) was compared to branched polymers from a batch reactor. Polymerization reactions occurred at a temperature of 150° C., in 585 g of ISOPAR-E™, 15 g of octene, and a hydrogen pressure ($\Delta H_2$) of 240 psi. 15 g of ethylene was loaded and pressure maintained in the presences of 0.3 μmole of Catalyst 1, 0.36 μmole of Co-Catalyst A (methyldi(tetradecyl)ammonium tetrakis (pentafluorophenyl)borate), and 10 μmole MMAO-3A. Diene dimethyldivinylsilane was added as indicated in the table.

TABLE 3

Polymer runs and characteristics of the batch reactor polymer of Example 2 and the comparative.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| 2.C | 0.0 | 10.6 | 3.2 | 110.3 | 22,707 | 66,568 | 57,544 | 0.026 | 0.00 | 0.00 |
| 2.1 | 1.0 | 7.2 | 2.7 | 116.6 | 26,781 | 110,643 | 91,201 | 0.018 | 0.10 | 0.15 |

| Ex. | Mn | Mw (g/mole) | Mp | $A_{TAIL}$ | gpcBR | $g'_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| 2.C | 26,756 | 71,200 | 57,546 | 0.025 | 0.17 | 0.92 | | | | | |
| 2.1 | 43,338 | 149,024 | 112,208 | 0.034 | 0.62 | 0.65 | 609,361 | 2,453 | 248.4 | | |

Table 3 collects data for the comparative example, 2.0 and diene example, 2.1. NMR data demonstrate both tri-functional (0.15 LCB/1000 C) and tetra-functional (0.10 LCB/1000 C) in a ratio of 1.4:1 (tri:tetra LCB).

The Dynamic Mechanical Spectrum of the branched Example 2.1 was measured and the results recorded in Table 3. The viscosity at 0.1 radians/second was determined to be 609,361 Pa s and the viscosity at 100 radians/second was measured to be 2,453 Pa s, providing a rheology ratio ($V_{0.1}/V_{100}$) of 248.4.

Batch Reactor Example 3

In Table 4, the polymer characteristics of a comparative linear polymer sample (3.C) was compared to branched polymers from a batch reactor. Polymerization reactions occurred at a temperature of 140° C., in 585 g of ISOPAR-E™, 15 g of octene, and a hydrogen pressure ($\Delta H_2$) of 240 psi. 10 g of ethylene was loaded and pressure maintained in the presences of 0.3 μmole of Catalyst 1, 0.36 μmole of Co-Catalyst A (methyldi(tetradecyl)ammonium tetrakis (pentafluorophenyl)borate), and 10 μmole MMAO-3A. Diene dimethyldivinylsilane was added as indicated in the table.

TABLE 4

Polymer runs and characteristics of the batch reactor polymer of Example 3 and the comparative.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| 3.C | 0.0 | 15.8 | 3.7 | 108.4 | 25,018 | 70,216 | 56,234 | 0.027 | 0.00 | 0.00 |
| 3.1 | 1.0 | 7.6 | 3.2 | 109.3 | 24,839 | 99,433 | 83,176 | 0.025 | 0.13 | 0.23 |

| Ex. | Mn | Mw (g/mole) | Mp | $A_{TAIL}$ | gpcBR | g'$_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| 3.C | 29,554 | 77,407 | 60,258 | 0.028 | 0.21 | 0.90 | | | | | |
| 3.1 | 39,382 | 135,054 | 102,334 | 0.034 | 0.69 | 0.64 | 515,022 | 2,140 | 240.6 | | |

Table 4 collects data for the comparative example, 3.0 and diene example, 1.1. NMR data demonstrate both tri-functional (0.23 LCB/1000 C) and tetra-functional (0.13 LCB/1000 C) in a ratio of 1.8:1 (tri:tetra LCB).

The Dynamic Mechanical Spectrum of the branched Example 3.1 was measured and the results recorded in Table 4. The viscosity at 0.1 radians/second was determined to be 515,022 Pa s and the viscosity at 100 radians/second was measured to be 2,140 Pa s, providing a rheology ratio ($V_{0.1}/V_{100}$) of 240.6.

Batch Reactor Example 4

In Table 5, the polymer characteristics of a comparative linear polymer sample (4.C) was compared to branched polymers from a batch reactor. Polymerization reactions occurred at a temperature of 150° C., in 585 g of ISOPAR-E™, 15 g of octene, and a hydrogen pressure ($\Delta H_2$) of 160 psi. 15 g of ethylene was loaded and pressure maintained in the presences of 0.4 µmole of Catalyst 1, 0.48 µmole of Co-Catalyst A (methyldi(tetradecyl)ammonium tetrakis (pentafluorophenyl)borate), and 10 µmole MMAO-3A. Diene dimethyldivinylsilane was added as indicated in the table.

TABLE 5

Polymer runs and characteristics of the batch reactor polymer of Example 4 and the comparative.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| 4.C | 0.0 | 14.4 | 3.0 | 110.5 | 30,841 | 89,621 | 70,795 | 0.026 | 0.00 | 0.00 |
| 4.1 | 1.0 | 8.5 | 2.2 | 116.1 | 32,496 | 136,886 | 109,648 | 0.017 | 0.30 | 0.31 |

| Ex. | Mn | Mw (g/mole) | Mp | $A_{TAIL}$ | gpcBR | g'$_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| 4.C | 39,419 | 97,380 | 75,861 | 0.027 | 0.16 | 0.94 | | | | | |
| 4.1 | 54,877 | 187,783 | 134,904 | 0.026 | 0.68 | 0.64 | 867,379 | 2,818 | 307.8 | | |

Table 5 collects data for the comparative example, 4.0 and diene example, 4.1. NMR data demonstrate both tri-functional (0.31 LCB/1000 C) and tetra-functional (0.30 LCB/1000 C) in a ratio of 1.03:1 (tri:tetra LCB).

The Dynamic Mechanical Spectrum of the branched Example 4.1 was measured and the results recorded in Table 5. The viscosity at 0.1 radians/second was determined to be 867,379 Pa s and the viscosity at 100 radians/second was measured to be 2,818 Pa s, providing a rheology ratio ($V_{0.1}/V_{100}$) of 307.8.

Batch Reactor Example 5

In Table 6, the polymer characteristics of a comparative linear polymer sample (5.C) was compared to branched polymers from a batch reactor. Polymerization reactions occurred at a temperature of 160° C., in 585 g of ISOPAR-E™, 15 g of octene, and a hydrogen pressure ($\Delta H_2$) of 80 psi. 15 g of ethylene was loaded and pressure maintained in the presences of 0.4 µmole of Catalyst 1, 0.48 µmole of Co-Catalyst A (methyldi(tetradecyl)ammonium tetrakis(pentafluorophenyl)borate), and 10 µmole MMAO-3A. Diene dimethyldivinylsilane was added as indicated in the table.

TABLE 6

Polymer runs and characteristics of the batch reactor polymer of Example 5 and the comparative.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| 5.C | 0.0 | 8.0 | 2.9 | 109.9 | 31,592 | 88,297 | 72,444 | 0.028 | 0.00 | 0.00 |
| 5.1 | 1.0 | 4.4 | 2.6 | 109.2 | 30,654 | 138,751 | 102,329 | 0.024 | 0.30 | 0.25 |

| Ex. | Mn | Mw (g/mole) | Mp | $A_{TAIL}$ | gpcBR | g'$_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| 5.C | 41,286 | 97,602 | 75,861 | 0.029 | 0.18 | 0.91 | | | | | |
| 5.1 | 52,894 | 196,329 | 128,832 | 0.045 | 0.76 | 0.63 | 813,746 | 2,742 | 296.7 | | |

Table 6 collects data for the comparative example, 5.0 and diene example, 5.1. NMR data demonstrate both tri-functional (0.25 LCB/1000 C) and tetra-functional (0.30 LCB/1000 C) in a ratio of 0.8:1 (tri:tetra LCB).

The Dynamic Mechanical Spectrum of the branched Example 5.1 was measured and the results recorded in Table 6. The viscosity at 0.1 radians/second was determined to be 813,746 Pa s and the viscosity at 100 radians/second was measured to be 2,742 Pa s, providing a rheology ratio ($V_{0.1}/V_{100}$) of 296.7.

Batch Reactor Example 6

In Table 7, polymerization reactions for example 6.1 occurred at a temperature of 150° C., in 585 g of ISOPAR-E™, 15 g of octene, and a hydrogen pressure ($\Delta H_2$) of 240 psi. 13 g of ethylene was loaded and pressure maintained in the presences of 0.3 µmole of Catalyst 1, 0.36 µmole of Co-Catalyst A (methyldi(tetradecyl)ammonium tetrakis(pentafluorophenyl)borate), and 10 µmole MMAO-3A. Diene dimethyldivinylsilane was added as indicated in the table. In Table 7, polymerization reactions for example 6.2 occurred at a temperature of 160° C., in 600 g of ISOPAR-E™, no octene, and a hydrogen pressure ($\Delta H_2$) of 240 psi. 13 g of ethylene was loaded and pressure maintained in the presences of 0.4 µmole of Catalyst 1, 0.48 µmole of Co-Catalyst A (methyldi(tetradecyl)ammonium tetrakis(pentafluorophenyl)borate), and 10 µmole MMAO-3A. Diene dimethyldivinylsilane was added as indicated in the table. In Table 7, polymerization reactions for example 6.3 occurred at a temperature of 160° C., in 600 g of ISOPAR-E™, no octene, and a hydrogen pressure ($\Delta H_2$) of 240 psi. 13 g of ethylene was loaded and pressure maintained in the presences of 0.4 µmole of Catalyst 2, 0.48 µmole of Co-Catalyst A (methyldi(tetradecyl)ammonium tetrakis(pentafluorophenyl)borate), and 10 µmole MMAO-3A. Diene dimethyldivinylsilane was added as indicated in the table.

TABLE 7

Polymer runs and characteristics of the batch reactor polymers of Example 6.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| | | | | | Conventional GPC Data and Metrics | | | | NMR per 1000C | |
| 6.1 | 1.0 | 8.0 | 3.4 | 111.3 | 21,704 | 85,320 | 74,131 | 0.028 | 0.11 | 0.23 |
| 6.2 | 0.8 | 6.0 | 0.2 | 133.8 | 20,656 | 89,275 | 70,795 | 0.036 | 0.12 | 0.26 |
| 6.3 | 0.8 | 2.8 | 0.1 | 131.8 | 19,059 | 90,786 | 87,096 | 0.025 | 0.19 | 0.07 |

| Ex. | Mn | Mw (g/mole) | Mp | $A_{TAIL}$ | gpcBR | $g'_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| | Absolute GPC Data and Metrics | | | | | | | | | | |
| 6.1 | 29,795 | 109,215 | 97,728 | 0.026 | 0.63 | 0.65 | 306,441 | 1,754 | 174.7 | | |
| 6.2 | | | | | | | | | | | |
| 6.3 | | | | | | | | | | | |

Table 7 collects data for diene examples, 6.1, 6.2, and 6.3. Examples 6.2 and 6.3 indicate different catalysts can form different amount of tri-functional LCB and different ratios of tri-functional LCB: tetra-functional LCB. For example under the same conditions, Catalyst 1 (Example 6.2) and Catalyst 2 (Example 6.3) had tri-functional LCB levels of 0.26 LCB/1000 C and 0.07 LCB/1000 C, and ratios of tri-functional:tetra-functional LCB of 2.2:1 and 0.4:1, respectively. The amount tri-functional LCB and the ratio of tri-functional:tetra-functional LCB depends very much on the catalyst.

Examples 6.1 and 6.2 indicate polymerizations runs under comparable conditions with the key difference being that Example 6.1 contains octene while Example 6.2 does not contain octene. The amount of tri-functional LCB and the ratio of tri-functional:tetra-functional LCB is very similar in the two runs.

The Dynamic Mechanical Spectrum of the Example 6.1 was measured and the results recorded in Table 7. The viscosity at 0.1 radians/second was determined to be 306,441 Pa s and the viscosity at 100 radians/second was measured to be 1,754 Pa s, providing a rheology ratio ($V_{0.1}/V_{100}$) of 174.7.

Batch Reactor Example 7

In Table 8, the polymer characteristics of a comparative linear polymer sample (7.C) was compared to branched polymers from a batch reactor. Polymerization reactions occurred at a temperature of 160° C., in 580 g of ISOPAR-E™, 20 g of octene, no hydrogen. 11 g of ethylene was loaded and pressure maintained in the presences of 0.7 µmole of Catalyst 1, 0.84 µmole of Co-Catalyst A (methyldi(tetradecyl)ammonium tetrakis(pentafluorophenyl)borate), and 10 µmole MMAO-3A. Diene dimethyldivinylsilane was added as indicated in the table.

TABLE 8

Polymer runs and characteristics of the batch reactor polymer of Example 7 and the comparative.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| | | | | | Conventional GPC Data and Metrics | | | | NMR per 1000C | |
| 7.C | 0.0 | 4.8 | 7.0 | 83.9 | 22,315 | 54,685 | 47,863 | 0.030 | 0.00 | 0.00 |
| 7.1 | 0.4 | 2.5 | 4.6 | 98.1 | 31,836 | 158,106 | 109,648 | 0.022 | 0.14 | 0.00 |

| Ex. | Mn | Mw (g/mole) | Mp | $A_{TAIL}$ | gpcBR | $g'_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| | Absolute GPC Data and Metrics | | | | | | | | | | |
| 7.C | 27,810 | 62,576 | 52,483 | 0.024 | 0.32 | 0.72 | | | | | |
| 7.1 | 44,485 | 195,862 | 138,046 | 0.047 | 0.98 | 0.57 | 475,848 | 1,982 | 240.1 | 17 | 30 |

Table 8 collects data for the comparative example, 7.0 and diene example, 7.1. NMR data demonstrated no tri-functional in this example with no hydrogen present. Tetra-functional LCB exists (0.14 LCB/1000 C) and the ratio of tri-functional:tetra-functional is zero.

The Dynamic Mechanical Spectrum of Example 7.1 was measured and the results recorded in Table 8. The viscosity at 0.1 radians/second was determined to be 475,848 Pa s and the viscosity at 100 radians/second was measured to be 1,982 Pa s, providing a rheology ratio ($V_{0.1}/V_{100}$) of 240.1.

Batch Reactor Example 8

In Table 9, the polymer characteristics of a comparative linear polymer sample (8.C) was compared to branched polymers from a batch reactor. Polymerization reactions occurred at a temperature of 160° C., in 580 g of ISOPAR-E™, 20 g of octene, and a hydrogen pressure ($\Delta H_2$) of 28 psi. 13 g of ethylene was loaded and pressure maintained in the presences of 0.7 μmole of Catalyst 1, 0.84 μmole of Co-Catalyst A (methyldi(tetradecyl)ammonium tetrakis (pentafluorophenyl)borate), and 10 μmole MMAO-3A. Diene dimethyldivinylsilane was added as indicated in the table.

TABLE 9

Polymer runs and characteristics of the batch reactor polymer of Example 8 and the comparative.

| Ex. | Diene Added (g) | Yield (g) | Octene (mol %) | Tm (° C.) | Mn | Mw (g/mole) | Mp | $A_{TAIL}$ | NMR per 1000C Tetra-functional LCB | Tri-functional LCB |
|---|---|---|---|---|---|---|---|---|---|---|
| 8.C | 0.0 | 7.8 | 4.0 | 97.8 | 28,770 | 84,078 | 66,069 | 0.029 | 0.00 | 0.00 |
| 8.1 | 0.5 | 5.0 | 3.7 | 102.4 | 30,764 | 148,308 | 114,815 | 0.024 | 0.11 | 0.09 |

| Ex. | Absolute GPC Data and Metrics Mn (g/mole) | Mw (g/mole) | Mp | $A_{TAIL}$ | gpcBR | $g'_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| 8.C | 35,677 | 92,734 | 74,134 | 0.031 | 0.22 | 0.85 | | | | | |
| 8.1 | 43,399 | 196,893 | 134,904 | 0.041 | 0.84 | 0.66 | 721,022 | 2,297 | 313.8 | 19 | 24 |

Table 9 collects data for the comparative example, 8.0 and diene example, 8.1. NMR data demonstrate both tri-functional (0.09 LCB/1000 C) and tetra-functional (0.11 LCB/1000 C) in a ratio of 0.8:1 (tri:tetra LCB).

The Dynamic Mechanical Spectrum of Example 8.1 was measured and the results recorded in Table 9. The viscosity at 0.1 radians/second was determined to be 721,022 Pa s and the viscosity at 100 radians/second was measured to be 2,297 Pa s, providing a rheology ratio ($V_{0.1}/V_{100}$) of 313.8.

Batch Reactor Example 9

In Table 10, the polymer characteristics of a comparative linear polymer sample (9.C) was compared to branched polymers from a batch reactor. Polymerization reactions occurred at a temperature of 160° C., in 580 g of ISOPAR-E™, 20 g of octene, and a hydrogen pressure ($\Delta H_2$) of 46 psi. 13 g of ethylene was loaded and pressure maintained in the presences of 0.7 µmole of Catalyst 1, 0.84 µmole of Co-Catalyst A (methyldi(tetradecyl)ammonium tetrakis(pentafluorophenyl)borate), and 10 µmole MMAO-3A. Diene dimethyldivinylsilane was added as indicated in the table.

TABLE 10

Polymer runs and characteristics of the batch reactor polymer of Example 9 and the comparative.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| 9.C | 0.0 | 7.7 | 4.0 | 98.2 | 25,660 | 74,066 | 57,544 | 0.028 | 0.00 | 0.00 |
| 9.1 | 0.5 | 5.1 | 3.6 | 102.3 | 27,859 | 124,975 | 97,724 | 0.029 | 0.10 | 0.09 |

| Ex. | Mn | Mw (g/mole) | Mp | $A_{TAIL}$ | gpcBR | g'$_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| 9.C | 33,526 | 82,244 | 67,611 | 0.027 | 0.22 | 0.72 | | | | | |
| 9.1 | 36,758 | 164,974 | 123,033 | 0.036 | 0.73 | 0.69 | 697,565 | 2,782 | 250.7 | 23 | 27 |

Table 10 collects data for the comparative example, 9.0 and diene example, 9.1. NMR data demonstrate both tri-functional (0.09 LCB/1000 C) and tetra-functional (0.10 LCB/1000 C) in a ratio of 0.9:1 (tri:tetra LCB).

The Dynamic Mechanical Spectrum of Example 9.1 was measured and the results recorded in Table 10. The viscosity at 0.1 radians/second was determined to be 697,565 Pa s and the viscosity at 100 radians/second was measured to be 2,782 Pa s, providing a rheology ratio ($V_{0.1}/V_{100}$) of 250.7.

Batch Reactor Example 10

In Table 11, the polymer characteristics of a comparative linear polymer sample (10.C) was compared to branched polymers from a batch reactor. Polymerization reactions occurred at a temperature of 160° C., in 575 g of ISOPAR-E™, 25 g of octene, and a hydrogen pressure ($\Delta H_2$) of 83 psi. 14 g of ethylene was loaded and pressure maintained in the presences of 0.6 µmole of Catalyst 1, 0.72 µmole of Co-Catalyst A (methyldi(tetradecyl)ammonium tetrakis (pentafluorophenyl)borate), and 10 µmole MMAO-3A. Diene dimethyldivinylsilane was added as indicated in the table.

TABLE 11

Polymer runs and characteristics of the batch reactor polymer of Example 10 and the comparative.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| 10.C | 0.0 | 7.9 | 4.8 | 94.9 | 23,081 | 63,456 | 51,286 | 0.028 | 0.00 | 0.00 |
| 10.1 | 0.5 | 6.7 | 4.3 | 100.4 | 21,896 | 89,318 | 75,858 | 0.032 | 0.10 | 0.07 |

| Ex. | Mn | Mw (g/mole) | Mp | $A_{TAIL}$ | gpcBR | g'$_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| 10.C | 29,451 | 72,424 | 60,258 | 0.025 | 0.25 | 0.72 | | | | | |
| 10.1 | 29,750 | 123,349 | 95,504 | 0.033 | 0.63 | 0.72 | 240,894 | 1,642 | 146.7 | 28 | 35 |

Table 11 collects data for the comparative example, 10.0 and diene example, 10.1. NMR data demonstrate both tri-functional (0.07 LCB/1000 C) and tetra-functional (0.10 LCB/1000 C) in a ratio of 0.7:1 (tri:tetra LCB).

The Dynamic Mechanical Spectrum of Example 10.1 was measured and the results recorded in Table 11. The viscosity at 0.1 radians/second was determined to be 240,894 Pa s and the viscosity at 100 radians/second was measured to be 1,642 Pa s, providing a rheology ratio ($V_{0.1}/V_{100}$) of 146.7.

Batch Reactor Example 11

In Table 12, the polymer characteristics of a comparative linear polymer sample (11.C) was compared to branched polymers from a batch reactor. Polymerization reactions occurred at a temperature of 150° C., in 575 g of ISOPAR-E™, 25 g of octene, and a hydrogen pressure ($\Delta H_2$) of 160 psi. 14 g of ethylene was loaded and pressure maintained in the presences of 0.4 µmole of Catalyst 1, 0.48 µmole of Co-Catalyst A (methyldi(tetradecyl)ammonium tetrakis (pentafluorophenyl)borate), and 10 µmole MMAO-3A. Diene dimethyldivinylsilane was added as indicated in the table.

TABLE 12

Polymer runs and characteristics of the batch reactor polymer of Example 11 and the comparative.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| 11.C | 0.0 | 9.9 | 4.5 | 96.1 | 24,528 | 72,817 | 57,544 | 0.028 | 0.00 | 0.00 |
| 11.1 | 0.5 | 9.8 | 4.6 | 97.9 | 24,043 | 90,135 | 74,131 | 0.026 | 0.06 | 0.09 |

| Ex. | Mn | Mw (g/mole) | Mp | $A_{TAIL}$ | gpcBR | g'$_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| 11.C | 30,271 | 80,477 | 70,797 | 0.021 | 0.22 | 0.72 | | | | | |
| 11.1 | 35,358 | 132,166 | 114,821 | 0.018 | 0.59 | 0.66 | 203,979 | 1,523 | 133.9 | 18 | 32 |

Table 12 collects data for the comparative example, 11.0 and diene example, 11.1. NMR data demonstrate both tri-functional (0.09 LCB/1000 C) and tetra-functional (0.06 LCB/1000 C) in a ratio of 1.5:1 (tri:tetra LCB).

The Dynamic Mechanical Spectrum of the Example 11.1 was measured and the results recorded in Table 12. The viscosity at 0.1 radians/second was determined to be 203,979 Pa s and the viscosity at 100 radians/second was measured to be 1,523 Pa s, providing a rheology ratio ($V_{0.1}/V_{100}$) of 133.9.

The measured melt-strength of the polymer of Example 11.1 was 18 cN with an extensibility of 32 mm/s.

Batch Reactor Example 12

In Table 13, the polymer characteristics of a comparative linear polymer sample (12.C) was compared to branched polymers from a batch reactor. Polymerization reactions occurred at a temperature of 150° C., in 570 g of ISOPAR-E™, 30 g of octene, and a hydrogen pressure ($\Delta H_2$) of 240 psi. 20 g of ethylene was loaded and pressure maintained in the presences of 0.3 μmole of Catalyst 1, 0.36 μmole of Co-Catalyst A (methyldi(tetradecyl)ammonium tetrakis (pentafluorophenyl)borate), and 10 μmole MMAO-3A. Diene dimethyldivinylsilane was added as indicated in the table.

TABLE 13

Polymer runs and characteristics of the batch reactor polymer of Example 12 and the comparative.

| Ex. | Diene Added (g) | Yield (g) | Octene (mol %) | Tm (° C.) | Mn | Mw (g/mole) | Mp | $A_{TAIL}$ | Tetra-functional LCB | Tri-functional LCB |
|---|---|---|---|---|---|---|---|---|---|---|
| | | | | | | Conventional GPC Data and Metrics | | | NMR per 1000C | |
| 12.C | 0.0 | 12.7 | 3.5 | 107.7 | 28,780 | 88,367 | 67,608 | 0.025 | 0.00 | 0.00 |
| 12.1 | 0.7 | 11.1 | 3.8 | 103.7 | 24,202 | 107,669 | 89,125 | 0.014 | 0.06 | 0.08 |

| Ex. | Mn | Mw (g/mole) | Mp | $A_{TAIL}$ | gpcBR | g'$_{avg}$ | $V_{0.1}$ Pa s | $V_{100}$ Pa s | $V_{0.1}/V_{100}$ | MS cN | Ext mm/s |
|---|---|---|---|---|---|---|---|---|---|---|---|
| | Absolute GPC Data and Metrics | | | | | | | | | | |
| 12.C | 34,769 | 95,728 | 85,118 | 0.021 | 0.18 | 0.72 | | | | | |
| 12.1 | 35,288 | 151,281 | 138,046 | 0.014 | 0.58 | 0.67 | 395,948 | 2,075 | 190.8 | 19 | 32 |

Table 13 collects data for the comparative example, 12.0 and diene example, 12.1. NMR data demonstrate both tri-functional (0.08 LCB/1000 C) and tetra-functional (0.06 LCB/1000 C) in a ratio of 1.3:1 (tri:tetra LCB) (see FIG. 7-FIG. 9).

Figure 10:
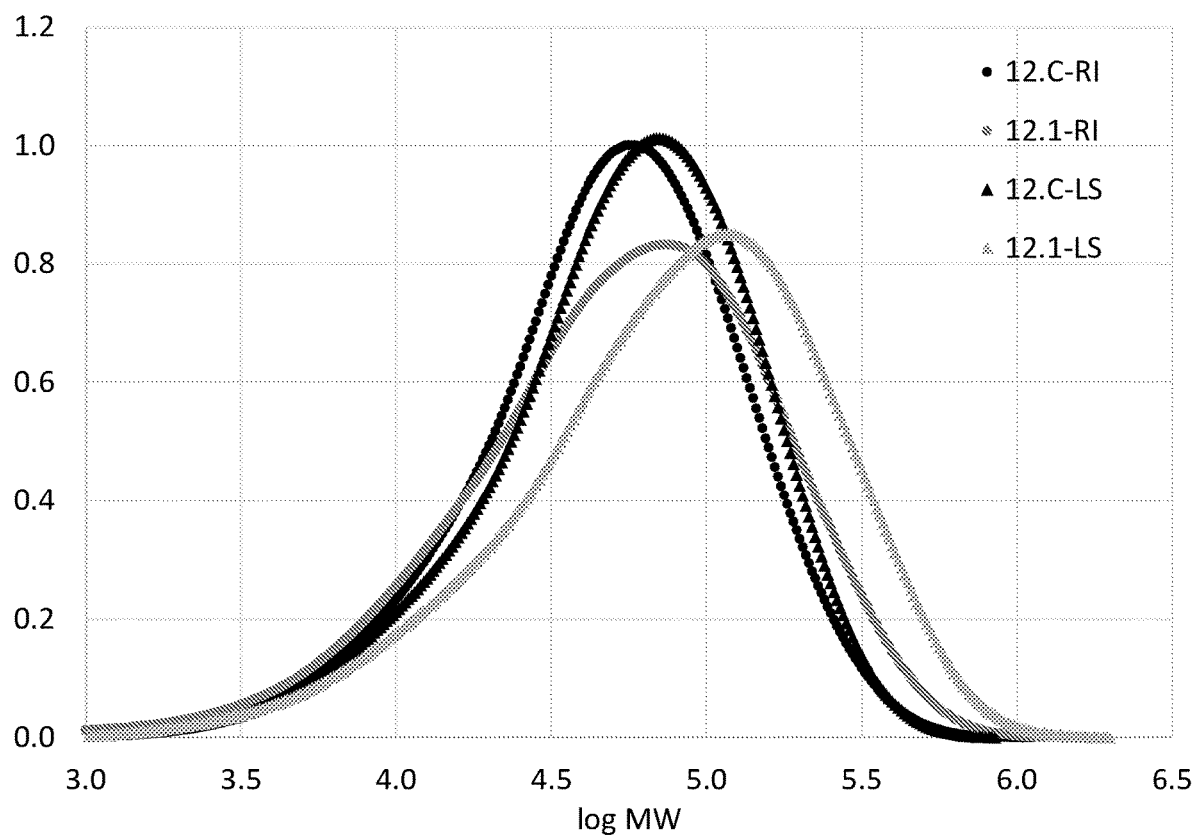
FIG. 10. Conventional (RI) and absolute (LS) GPC for linear PE (Example 12.C) and dimethyldivinylsilane branched PE (Example 12.1).

The conventional and absolute molecular weights for Examples 12.0 and 12.1 are plotted in FIG. 10.

Figure 11:
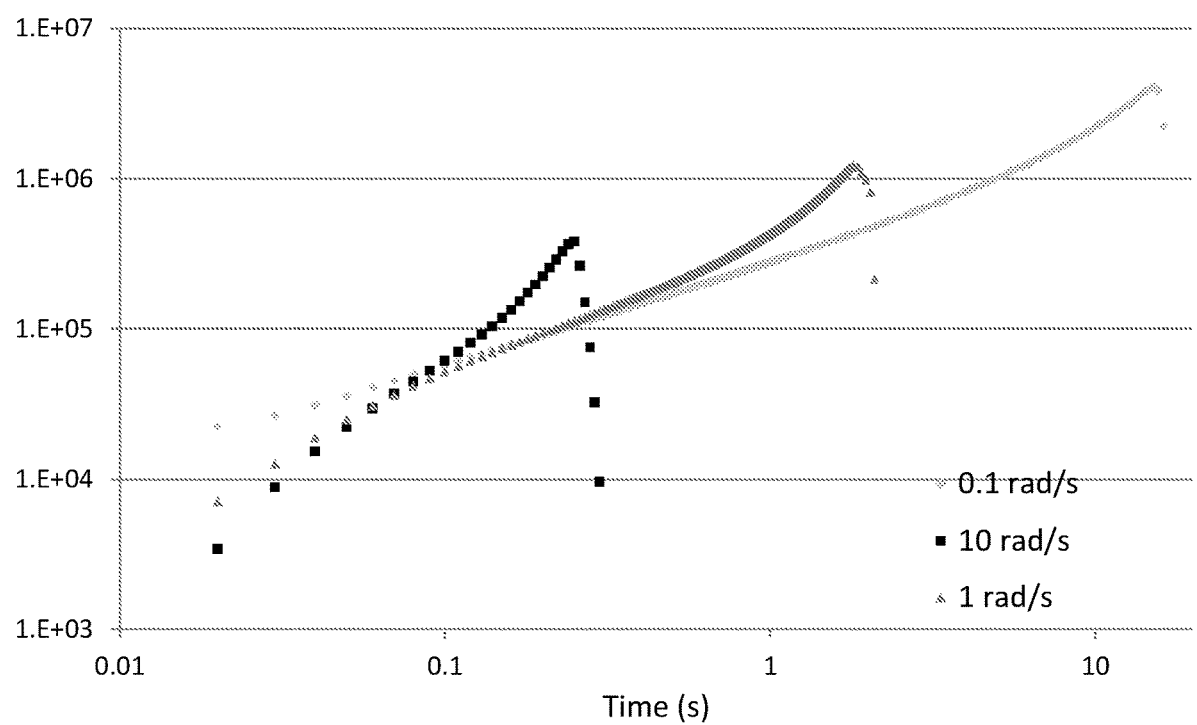
FIG. 11. Extensional viscosity fixture (EVF) of dimethyldivinylsilane branched PE (Example 12.1).

The extensional viscosity fixture (EVF) for Example 12.1 is shown in FIG. 11.

Figure 12:
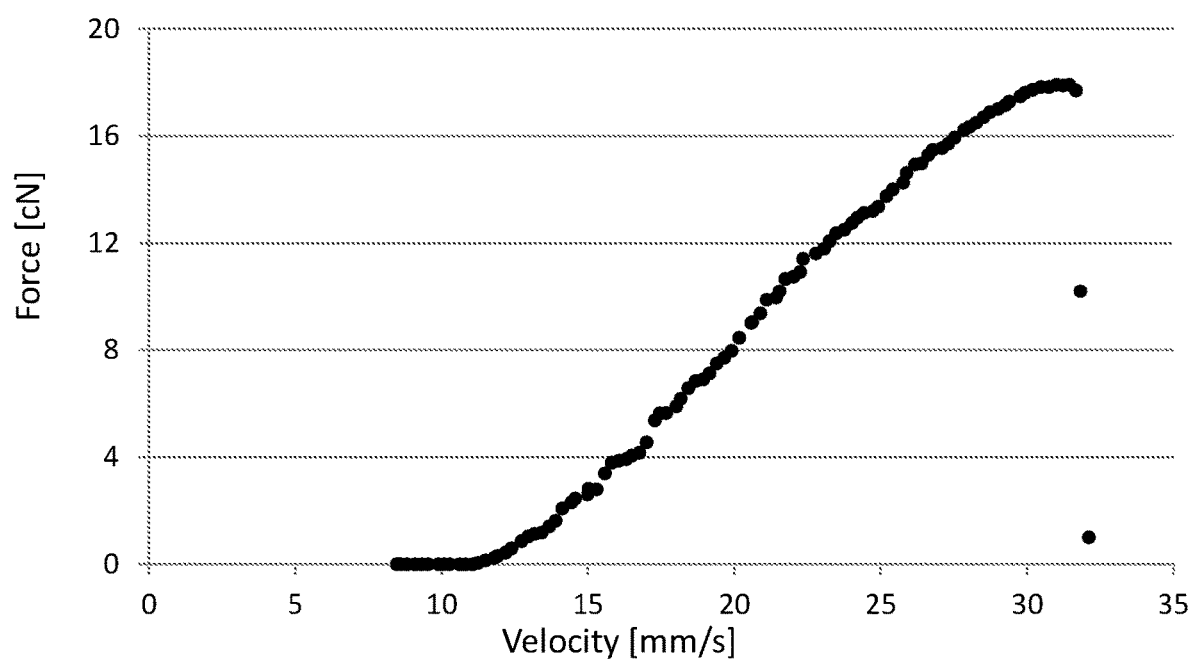
FIG. 12. Melt strength plot of dimethyldivinylsilane branched polyethylene (Example 12.1).

The measured melt-strength of the polymer of Example 12.1 was 19 cN with an extensibility of 32 mm/s (see FIG. 12).

Figure 13:
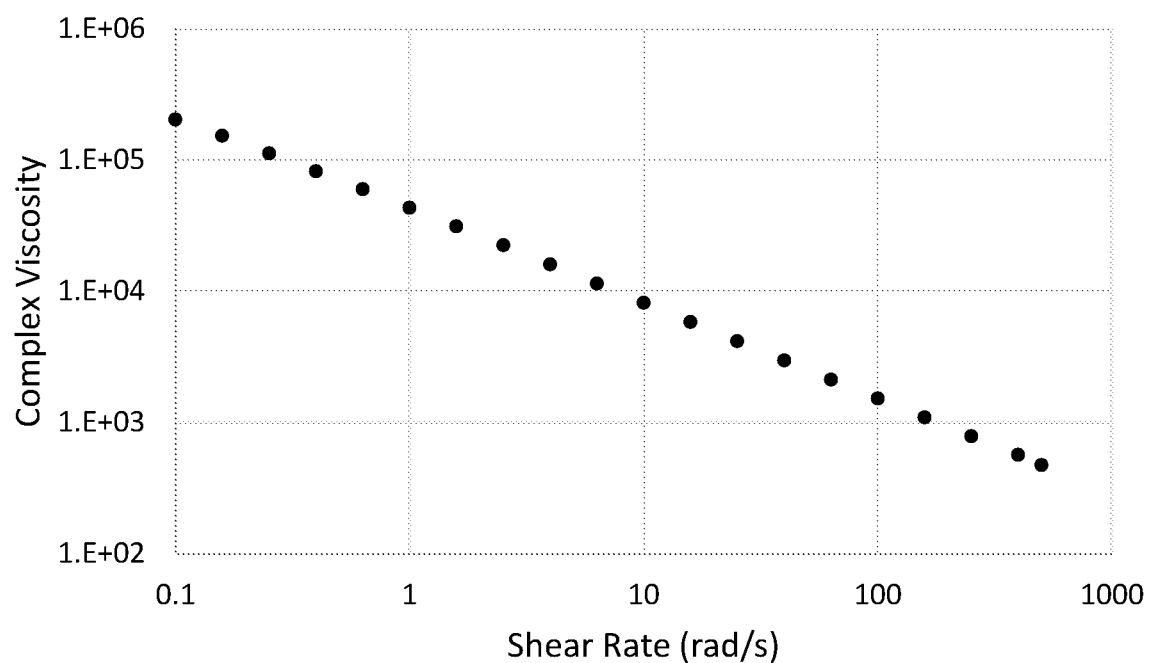
FIG. 13. DMS at 190° C. of dimethyldivinylsilane branched polyethylene (Example 12.1).

The Dynamic Mechanical Spectrum of the Example 12.1 was measured and the results recorded in Table 13. The viscosity at 0.1 radians/second was determined to be 395,948 Pa s and the viscosity at 100 radians/second was measured to be 2,075 Pa s, providing a rheology ratio ($V_{0.1}/V_{100}$) of 190.8 (see FIG. 13).

Batch Reactor Example 13

In Table 14, the polymer characteristics of a comparative linear polymer sample (13.C) was compared to branched polymers from a batch reactor. Polymerization reactions occurred at a temperature of 150° C., in 585 g of ISOPAR-E™, 15 g of octene, and a hydrogen pressure ($\Delta H_2$) of 240 psi. 11 g of ethylene was loaded and pressure maintained in the presences of 0.4 μmole of Catalyst 1, 0.48 μmole of Co-Catalyst A (methyldi(tetradecyl)ammonium tetrakis (pentafluorophenyl)borate), and 10 μmole MMAO-3A. Diene dimethyldivinylsilane was added as indicated in the table.

TABLE 14

Polymer runs and characteristics of the batch reactor polymer of Example 13 and the comparative.

| Ex. | Diene Added (g) | Yield (g) | Octene (mol %) | Tm (° C.) | Conventional GPC Data and Metrics | | | | NMR per 1000C | |
|---|---|---|---|---|---|---|---|---|---|---|
| | | | | | Mn | Mw (g/mole) | Mp | $A_{TAIL}$ | Tetra-functional LCB | Tri-functional LCB |
| 13.C | 0.0 | 9.1 | 4.3 | 107.6 | 17,461 | 50,546 | 42,658 | 0.028 | 0.00 | 0.00 |
| 13.1 | 0.4 | 7.3 | 3.0 | 113.1 | 18,462 | 70,901 | 58,884 | 0.029 | 0.07 | 0.12 |

| Ex. | Absolute GPC Data and Metrics | | | | | | | | | | |
|---|---|---|---|---|---|---|---|---|---|---|---|
| | Mn | Mw (g/mole) | Mp | $A_{TAIL}$ | gpcBR | $g'_{avg}$ | $V_{0.1}$ Pa s | $V_{100}$ Pa s | $V_{0.1}/V_{100}$ | MS cN | Ext mm/s |
| 13.C | 20,702 | 65,424 | 47,865 | 0.036 | 0.22 | 0.72 | | | | | |
| 13.1 | 25,816 | 85,854 | 77,628 | 0.023 | 0.53 | 0.66 | 53,390 | 887 | 60.2 | 10 | 65 |

Table 14 collects data for the comparative example, 13.0 and diene example, 13.1. NMR data demonstrate both tri-functional (0.12 LCB/1000 C) and tetra-functional (0.07 LCB/1000 C) in a ratio of 1.7:1 (tri:tetra LCB).

The Dynamic Mechanical Spectrum of the Example 13.1 was measured and the results recorded in Table 14. The viscosity at 0.1 radians/second was determined to be 53,390 Pa s and the viscosity at 100 radians/second was measured to be 887 Pa s, providing a rheology ratio ($V_{0.1}/V_{100}$) of 60.2.

The measured melt-strength of the polymer of Example 13.1 was 10 cN with an extensibility of 65 mm/s.

Example 7 (Table 8) to Example 13 (Table 14) indicate that for a given catalyst and comparable conditions, control of the ratio of tri-functional to tetra-functional LCB can be controlled by the ratio of hydrogen to ethylene in the reactor, supporting the mechanism in Scheme 6.

Example 7 (Table 8) to Example 13 (Table 14) indicate that as the ratio of tri-functional to tetra-functional LCB is increased, $M_w/M_{w0}$ is systematically decreased where $M_w$ is the weight averaged molecular weight of the diene branched sample and $M_{w0}$ is the weight averaged molecular weight of the unbranched comparative sample. The reduced increase in $M_w$ as a higher ratio of tri-functional branching is included supports the tri-functional kinetic model here and the previously derived tetra-functional model as described in U.S. Provisional Applications 62/738,606, 62/73,8612, 62/738,621, and 62/738,633, each application filed on Sep. 28, 2018.

Guzman-2010 demonstrated and analyzed the MWD and physical properties resulting from conventional diene branching in a steady-state CSTR. A constrained geometry catalyst (CGC) was used to copolymerize ethylene, 1-octene, and 1,9-decadiene in a very well mixed one-gallon reactor system. The particular CGC catalyst, used by Guzman-2010, was described in detail by U.S. Pat. No. 5,965,756 (structure IX) and U.S. Pat. No. 7,553,917 (Example 3). The Guzman-2010 catalyst was designed to grow a single chain from the catalyst center. Guzman-2010's data were gathered at steady state while operating a CSTR at a pressure of 525 psig and a temperature of 155° C. over a range of diene feed concentrations. The various steady-state polymer samples collected by Guzman-2010 contained no measurable levels of gels or insoluble material. However, at the highest level of dienes feed some minor internal reactor fouling was observed, and it was anticipated that higher levels of dienes feed would result in gels formation or reactor MWD instability.

In Guzman-2010, a selected series of data was summarized for otherwise fixed reactor conditions over a spectrum of diene feed levels. Throughout the series, the ethylene and 1-octene feed concentrations were set at 13.8 wt % and 3.6 wt %, respectively. The catalyst feed rate was continuously adjusted to maintain a constant ethylene conversion of 79% throughout the series resulting in a fixed polymer production rate of 2.2 kg/hr. The polymer density, a measure of copolymer composition, was constant at about 0.922 g/cc.

The data in Guzman-2010 demonstrated how changes in conventional diene branching level affects average molecular weight and polydispersity as well as properties such as viscosity, as reflected by $I_2$ and $I_{10}$. The effect of conventional diene branching on molecular weight was shown for both absolute and conventional MWD measurement techniques. While absolute MWD measurement is the preferred method for branched polymers, it is not always available. Therefore, Guzman-2010 also contains molecular weights measured by conventional techniques using a refractive index detector. The results in Table 33 demonstrated that, by either measurement technique, the weight average molecular weight ($M_w$) rises substantially as the diene feed is increased from zero to 923 ppm.

Figure 14:
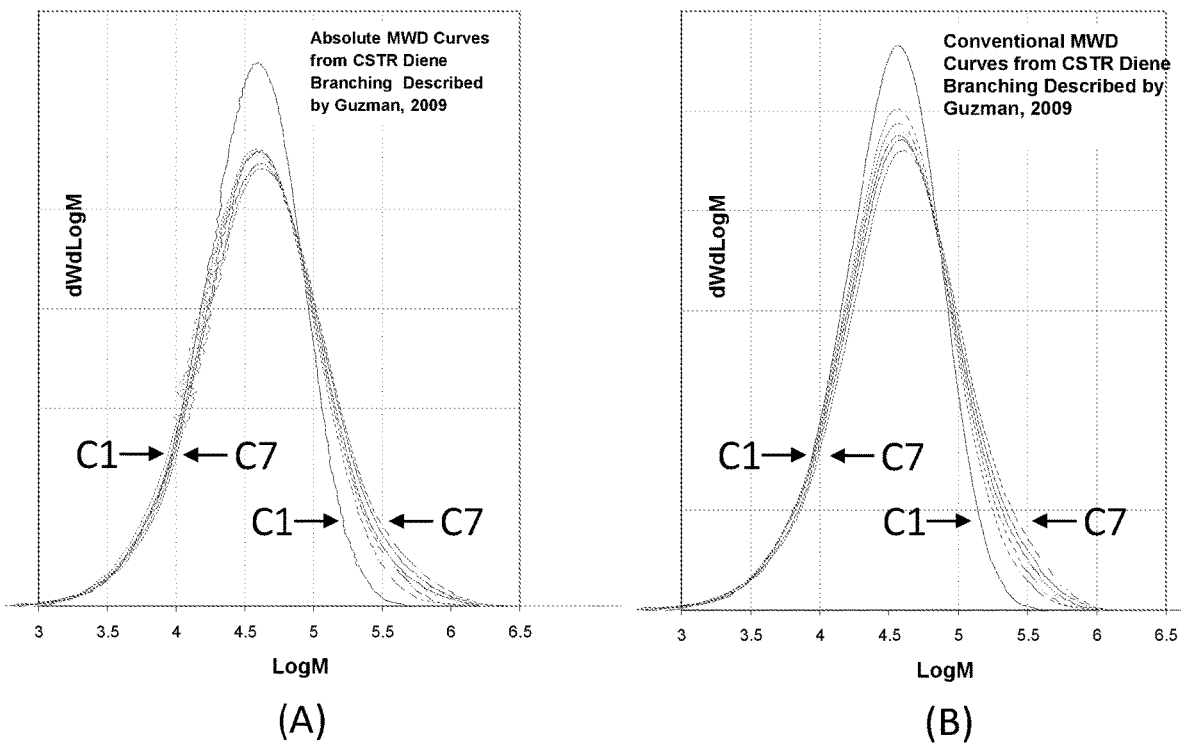
FIG. 14A is a graph of the absolute molecular weight distributions of comparative conventional branched polymer samples with varying amounts of diene.
FIG. 14B is a graph of the conventional molecular weight distributions of comparative conventional branched polymer samples with varying amounts of diene.

Though not reported in Guzman-2010, the MWD curves were found and plotted in FIG. 14A and FIG. 14B for absolute and conventional GPC measurement techniques, respectively. The MWD curve data in FIG. 14 demonstrated that the expected high $M_w$ tail formation resulting from conventional diene branching occurred. The lack of significant movement of the peak MW with increasing diene branching is also apparent from the MWD curves.

The molecular weight distributional data in FIG. 14A and FIG. 14B were reduced to simple metrics describing the evolution of the MWD curve position and shape as more diene monomers were fed to the CSTR. The data showed these MWD metrics for both absolute and conventional MWD measurements of the Guzman-2010's polymer samples. Absolute MWD measurement data showed up to an 87% increase in molecular weight as 1,9-decadiene feed ranged from 0 to 923 ppm. Peak molecular weight change, as indicated by $M_p$, does not vary significantly for either means of molecular weight measurement, which is inconsistent with "Ladder branched" polymer results. The shape factors are summarized in Table 34 (Guzman-2010) and are inconsistent with "Ladder branched" polymers because the values for both $G_{79/29}$ and $A_{TAIL}$ increased as the diene feed level and $M_w$ increased.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. A polymer comprising the polymerized product of ethylene, at least one diene comonomer, and optionally at least one $C_3$ to $C_{14}$ comonomer in the presence of a dual chain catalyst, wherein: the diene has a structure according to formula (I):

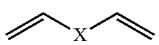
(I)

where X is $SiR_2$, wherein each R is independently $C_1$-$C_{12}$ hydrocarbyl or —H; and the polymer comprises tri-functional long-chain branches resulting from the diene that occur at a frequency of at least 0.03 per 1000 carbon atoms of the polymer.

2. The polymer of claim 1, wherein the diene is dimethyldivinylsilane.

3. The polymer of claim 1, wherein the polymer is an ethylene-based copolymer comprising at least 50 mol % ethylene.

4. The polymer of claim 1, wherein the polymer is defined by molecular weight tail, which is quantified by a molecular weight distribution (MWD) area metric, Atail, wherein the Atail is less than or equal to 0.04 as determined by gel permeation chromatography using a triple detector.

5. The polymer of claim 1, wherein the polymer has an average g' from 0.55 to 0.86, where the average g' is an intrinsic viscosity ratio determined by gel permeation chromatography using a triple detector.

6. The polymer of claim 1, wherein the polymer has a melt viscosity ratio ($V_{0.1}/V_{100}$) at 190° C. of at least 20, where $V_{0.1}$ is the viscosity of the polymer at 190° C. at a shear rate of 0.1 radians/second, and $V_{100}$ is the viscosity of the ethylene-based polymer at 190° C. at a shear rate of 100 radians/second.

7. The polymer of claim 6, wherein the melt viscosity ratio ($V_{0.1}/V_{100}$) at 190° C. is at least 50.

8. The polymer of claim 1, wherein the tri-functional long-chain branches occur at a frequency of at least 0.05 per 1000 carbon atoms.

9. The polymer of claim 1, wherein the tri-functional long-chain branches occur at a frequency of at least 0.1 per 1000 carbon atoms.

10. The polymer of claim 1, wherein the polymer has a melt strength of greater than 6 cN.

11. The polymer of claim 1, wherein the polymer has a weight average molecular weight (Mw) of less than or equal to 800,000 Daltons, as determined by gel permeation chromatography using a triple detector.

12. The polymer of claim 1, wherein the polymer has a weight average molecular weight (Mw) of less than or equal to 400,000 Daltons, as determined by gel permeation chromatography using a triple detector.

13. The polymer of claim 1, wherein the polymer has a weight average molecular weight (Mw) of less than or equal to 200,000 Daltons, as determined by gel permeation chromatography using a triple detector.

14. The polymer of claim 1, wherein the polymer has a weight average molecular weight (Mw) of less than 150,000 Daltons, as determined by gel permeation chromatography using a triple detector.

15. The polymer of claim 1, wherein the polymer has a weight average molecular weight/number average molecular weight, Mw/Mn, of less than 4, as determined by gel permeation chromatography using a triple detector.

* * * * *